US010822240B2

(12) United States Patent
Pegna et al.

(10) Patent No.: US 10,822,240 B2
(45) Date of Patent: Nov. 3, 2020

(54) HIGH STRENGTH CERAMIC FIBERS AND METHODS OF FABRICATION

(71) Applicant: FREE FORM FIBERS, LLC, Saratoga Springs, NY (US)

(72) Inventors: Joseph Pegna, Saratoga Springs, NY (US); John L. Schneiter, Cohoes, NY (US); Kirk L. Williams, Saratoga Springs, NY (US); Ramkiran Goduguchinta, Ballston Lake, NY (US)

(73) Assignee: FREE FORM FIBERS, LLC, Saratoga Springs, NY (US)

( * ) Notice: Subject to any disclaimer, the term of this patent is extended or adjusted under 35 U.S.C. 154(b) by 0 days.

(21) Appl. No.: 16/101,730

(22) Filed: Aug. 13, 2018

(65) Prior Publication Data
US 2019/0062222 A1 Feb. 28, 2019

Related U.S. Application Data

(62) Division of application No. 14/372,085, filed as application No. PCT/US2013/022053 on Jan. 18, 2013, now Pat. No. 10,047,015.

(Continued)

(51) Int. Cl.
*C01B 32/956* (2017.01)
*C04B 35/565* (2006.01)
(Continued)

(52) U.S. Cl.
CPC .......... *C01B 32/956* (2017.08); *C04B 35/565* (2013.01); *C04B 35/62865* (2013.01);
(Continued)

(58) Field of Classification Search
CPC .......... C01B 32/956; C04B 2235/3409; C04B 2235/5244; C04B 2235/5264;
(Continued)

(56) References Cited

U.S. PATENT DOCUMENTS 3,062,683 A 11/1962 Kalleberg et al.
3,148,102 A 9/1964 Eakins et al.
(Continued)

FOREIGN PATENT DOCUMENTS

CN 103387230 A 11/2013
EP 1 209 123 A2 5/2009
(Continued)

OTHER PUBLICATIONS

Wallenberger, "Strong, Small Diameter, Boron Fibers by LCVD", Materials Letters, vol. 14 (1992), pp. 198-202.
(Continued)

*Primary Examiner* — Camie S Thompson
(74) *Attorney, Agent, or Firm* — Kevin P. Radigan, Esq.; Heslin Rothenberg Farley & Mesiti P.C.

(57) ABSTRACT

A method and apparatus for forming a plurality of fibers from (e.g., CVD) precursors, including a reactor adapted to grow a plurality of individual fibers; and a plurality of independently controllable lasers, each laser of the plurality of lasers growing a respective fiber. A high performance fiber (HPF) structure, including a plurality of fibers arranged in the structure; a matrix disposed between the fibers; wherein a multilayer coating is provided along the surfaces of at least some of the fibers with an inner layer region having a sheet-like strength; and an outer layer region, having a particle-like strength, such that any cracks propagating toward the outer layer from the matrix propagate along the outer layer and back into the matrix, thereby preventing the cracks from approaching the fibers. A method of forming an interphase in a ceramic matrix composite material having a plurality of SiC fibers, which maximizes toughness by minimizing fiber to fiber bridging, including arranging a plurality of SiC fibers into a preform; selectively removing (e.g., etching) silicon out of the surface of the (Continued)

fibers resulting in a porous carbon layer on the fibers; and replacing the porous carbon layer with an interphase layer (e.g., Boron Nitride), which coats the fibers to thereby minimize fiber to fiber bridging in the preform.

20 Claims, 19 Drawing Sheets

Related U.S. Application Data

(60) Provisional application No. 61/588,733, filed on Jan. 20, 2012, provisional application No. 61/588,765, filed on Jan. 20, 2012, provisional application No. 61/588,788, filed on Jan. 20, 2012.

(51) Int. Cl.
    *C04B 35/628*     (2006.01)
    *C04B 35/80*     (2006.01)
    *D01F 9/08*     (2006.01)
    *C04B 35/76*     (2006.01)

(52) U.S. Cl.
    CPC .. *C04B 35/62868* (2013.01); *C04B 35/62873* (2013.01); *C04B 35/76* (2013.01); *C04B 35/806* (2013.01); *D01F 9/08* (2013.01); *C04B 2235/3409* (2013.01); *C04B 2235/5244* (2013.01); *C04B 2235/5264* (2013.01); *C04B 2235/616* (2013.01); *D10B 2101/16* (2013.01); *Y10T 428/249964* (2015.04)

(58) Field of Classification Search
    CPC ............ C04B 35/565; C04B 35/62865; C04B 35/62873; C04B 35/76; C04B 35/806; C04B 35/62863; C04B 35/62894; C04B 35/62897; C04B 35/62868; D10B 2101/16; C03C 2214/02; C03C 25/42; C03C 25/44; C03C 25/52; C23C 15/545; D01F 9/08
    USPC ............ 427/154, 249.5, 204, 264, 402, 309; 501/35, 90, 95.2; 428/293.4, 299.1, 428/294.1, 698, 368, 311.51; 423/345
    See application file for complete search history.

(56) References Cited

U.S. PATENT DOCUMENTS

| | | | |
|---|---|---|---|
| 3,755,061 A | 8/1973 | Schurb | |
| 3,958,406 A | 5/1976 | Corbiere | |
| 4,076,380 A | 2/1978 | DiMarcello | |
| 4,539,248 A | 9/1985 | Brockington et al. | |
| 4,588,699 A | 5/1986 | Brennan et al. | |
| 4,962,070 A | 10/1990 | Sullivan | |
| 5,071,679 A * | 12/1991 | Heraud | C04B 35/80 427/204 |
| 5,096,739 A | 3/1992 | Strutt et al. | |
| 5,133,993 A * | 7/1992 | Streckert | C04B 35/571 427/226 |
| 5,134,020 A | 7/1992 | Cotteret et al. | |
| 5,296,288 A | 3/1994 | Kourtides et al. | |
| 5,326,731 A | 7/1994 | Bhola et al. | |
| 5,342,022 A | 8/1994 | Artjushenko et al. | |
| 5,399,430 A | 3/1995 | Nordine et al. | |
| 5,705,122 A | 1/1998 | Curran | |
| 5,786,023 A | 7/1998 | Maxwell et al. | |
| 5,955,391 A | 9/1999 | Kameda et al. | |
| 6,183,714 B1 | 2/2001 | Smalley et al. | |
| 6,291,058 B1 | 9/2001 | Goujard et al. | |
| 6,322,889 B1 | 11/2001 | Lara-Curzio et al. | |
| 6,323,413 B1 | 11/2001 | Roth et al. | |
| 6,706,400 B2 | 3/2004 | Mercuri et al. | |
| 7,657,142 B2 | 2/2010 | Gasca et al. | |
| 7,666,475 B2 | 2/2010 | Morrison | |
| 9,206,508 B1 | 12/2015 | Hariharan et al. | |
| 9,217,210 B2 | 12/2015 | Velev et al. | |
| 9,896,385 B2 | 2/2018 | Harrison et al. | |
| 9,938,393 B2 | 4/2018 | Schneiter et al. | |
| 2002/0085968 A1 | 7/2002 | Smalley | |
| 2005/0048859 A1 | 3/2005 | Canahan et al. | |
| 2005/0082676 A1 | 4/2005 | Andry et al. | |
| 2005/0181192 A1 | 8/2005 | Steffier | |
| 2005/0247904 A1 | 11/2005 | Raj et al. | |
| 2005/0255033 A1 | 11/2005 | Shimoji et al. | |
| 2006/0039524 A1 | 2/2006 | Feinroth et al. | |
| 2006/0115648 A1 | 6/2006 | Chen | |
| 2007/0093587 A1 | 4/2007 | Shen et al. | |
| 2008/0143209 A1 | 6/2008 | Tan et al. | |
| 2008/0153959 A1 | 6/2008 | Charati et al. | |
| 2008/0175988 A1 | 7/2008 | Chiu et al. | |
| 2009/0064476 A1 | 3/2009 | Cross et al. | |
| 2010/0040834 A1 | 2/2010 | Dawes et al. | |
| 2010/0055352 A1 | 3/2010 | Maxwell | |
| 2011/0124483 A1 | 5/2011 | Shah et al. | |
| 2011/0170653 A1 | 7/2011 | Cabrero et al. | |
| 2011/0274906 A1 | 11/2011 | Kim et al. | |
| 2011/0286570 A1 | 11/2011 | Farmer et al. | |
| 2012/0002777 A1 | 1/2012 | Lahoda et al. | |
| 2012/0076718 A1 | 3/2012 | Liu et al. | |
| 2012/0135224 A1 | 5/2012 | Guzman de Villoria et al. | |
| 2012/0287553 A1 | 11/2012 | Ramani et al. | |
| 2012/0315467 A1 | 12/2012 | Lafdi et al. | |
| 2012/0315815 A1 | 12/2012 | Fong et al. | |
| 2013/0010915 A1 | 1/2013 | Gamier et al. | |
| 2013/0077731 A1 | 3/2013 | Sherwood et al. | |
| 2013/0093122 A1 | 4/2013 | Schultz et al. | |
| 2013/0163711 A1 | 6/2013 | Zabiego et al. | |
| 2013/0329849 A1 | 12/2013 | Mazaudier | |
| 2014/0170919 A1 | 6/2014 | Manipatruni et al. | |
| 2015/0004393 A1 | 1/2015 | Pegna et al. | |
| 2016/0347672 A1 | 12/2016 | Harrison | |
| 2017/0213604 A1 | 7/2017 | Pegna et al. | |
| 2017/0326838 A1 | 11/2017 | Pegna et al. | |
| 2017/0331022 A1 | 11/2017 | Pegna et al. | |
| 2017/0369998 A1 | 12/2017 | Pegna et al. | |
| 2018/0087157 A1 | 3/2018 | Harrison et al. | |
| 2018/0087214 A1 | 3/2018 | Harrison et al. | |
| 2018/0148864 A1 | 5/2018 | Harrison et al. | |

FOREIGN PATENT DOCUMENTS

| | | |
|---|---|---|
| GB | 2054542 B | 1/1983 |
| JP | 61-132628 A | 6/1986 |
| JP | H 03-285877 A | 12/1991 |
| JP | H 07-252662 A | 3/1995 |
| JP | H 08-505355 A | 6/1996 |
| JP | H 09-268065 A | 10/1997 |
| JP | H 10-045480 A | 2/1998 |
| JP | H 10-059780 A | 3/1998 |
| JP | 2002-211980 A | 7/2002 |
| JP | 2005-231952 A | 9/2005 |
| JP | 2013-210372 A | 10/2013 |
| WO | WO 1988/001204 A1 | 2/1988 |
| WO | WO 2010/090624 A1 | 8/2010 |
| WO | WO 2012/108941 A1 | 8/2012 |
| WO | WO 2012/109841 A1 | 8/2012 |
| WO | WO 2013/180764 A1 | 12/2013 |
| WO | WO 2014/143937 A1 | 9/2014 |
| WO | WO 2015/200257 A1 | 12/2015 |

OTHER PUBLICATIONS

Johansson et al., "Microfabrication of Three-Dimensional Boron Structures by Laser Chemical Processing", J. Appl. Phys., vol. 72 (12), Dec. 19, 1992 (8 pages).

Wallenberger, Frederick T., "Inorganic Fibres and Microfabricated Parts by Laser Assisted Chemical Vapour Deposition (LCVD): Structures and Properties*", Ceramics International, 23 (1995) (8 pages).

(56) References Cited

OTHER PUBLICATIONS

Maxwell et al., "Real-Time Volumetric Growth Rate Measurements and Feedback Control of Three-Dimensional Laser Chemical Vapor Deposition)", Appl. Phys. A, vol. 67, No. 3, 1998 (7 pages).
Waku et al., "An Amorphous Ceramic A132.4Er7.6O60 Fiber with Large Viscous Flow Deformation and a High-Strength Nanocrystallized Ceramic Fiber", Journal of Materials Science, vol. 36, No. 10, pp. 2435-2440 (May 15, 2001).
Wen et al., "Interfacial Microstructure and Reaction of BN-Coated Single Crystal Al2O3 Fiber Reinforced NiAl Matrix Composites", Journal of Materials Science, vol. 37, No. 6, Mar. 1, 2002 (pp. 1253-1258).
Kerans, "High Temperature Composites", Air Force Research Laboratory Report No. AFRL-ML-WL-TP-2002-407, Aug. 2002 (22 pages).
Kerans et al., "Interface Design for Oxidation-Resistant Ceramic Composites", Journal of the American Ceramic Society, vol. 85, No. 11, pp. 2599-2632 (Nov. 1, 2002).
Behlau et al., "Mechanical Properties of Carbon and BN Coated SiC Fibers", Ceramic Engineering and Science Proceedings, vol. 24, No. 4, Jan. 1, 2003 (pp. 225-230).
Chen et al., "Carbide Derived Carbon (CDC) Coatings for Tyranno ZMI SiC Fibers", Ceramic Engineering and Science Proceedings, vol. 24, No. 3, Jan. 26, 2003 (pp. 57-62).
Chen et al., "Carbothermal Synthesis of Al—O—N Coatings Increasing Strength of SiC Fibers", International Journal of Applied Ceramic Technology, vol. 1, No. 1, Jan. 1, 2004 (pp. 68-75).
Lee et al., "Microstructure and Mechanical Properties of Al2O3/Y3Al5O12/ZrO2 Ternary Eutectic Materials", Journal of European Ceramic Society, vol. 25, No. 8, pp. 1411-1417 (Jan. 1, 2005).
Maxwell et al., "Preparation of Superhard BxCy Fibers by Microvortex-Flow Hyperbaric Laser Chemical Deposition", Diamon & Related Materials, vol. 16, Jan. 2007 (1557-1564).
Longtin et al., "Systhesis of Carbon Nanofiber Films and Nanofiber Composite Coatings by Laser-Assisted Catalytic Chemical Vapor Deposition", Thin Solid Films, vol. 515 (2007) pp. 2958-2964.
Longtin et al., "Selective Area Synthesis of Aligned Carbon Nanofibers by Laser-Assisted Catalytic Chemical Vapor Deposition", Diamond and Related Materials, vol. 16 (2007) pp. 1541-1549.
Liao et al., "Large-Scale Aligned Silicon Carbonitride Nanotube Arrays: Synthesis, Characterization, and Field Emission Property", Journal of Applied Physics, vol. 101, No. 11, pp. 114306.1-114306.4 (Jun. 7, 2007).
Hu et al., "Oxidation Behavior of Zirconium Diboride-Silicon Carbide at 1800° C", Scripta Materialia, vol. 57, No. 9, Nov. 2007 (pp. 825-828).
Marsh, "Quantum Well Intermixing Revolutionizes High Power Laser Diodes", Diodenlaser, LTJ No. 5, 4:32-35, doi:10.1002/latj.200790190 (Nov. 2007) (4 pages).
Liu et al., "Monolithic Integration of Sampled Grating CBR with Electroabsorption Modulator by Combining Selective-Area-Growth MOCVD and Quantum-Well Intermixing", Chinese Physics Letters, vol. 25, No. 10, Oct. 1, 2008 (pp. 3670-3672).
Jouanny et al., "Study of TiC Coatings on Nicalon Fibre Prepared by Pressure-Pulsed Reactive Chemical Vapour Deposition at Low Pressure", ECS Translations, vol. 25, No. 8, Jan. 1, 2009 (pp. 1267-1272).
Roy et al., "Atomic Layer Deposition of Alumina Onto Carbon Fibers", Journal of the American Ceramic Society, vol. 94, No. 7, pp. 2014-2022 (Jul. 1, 2011).
Zhang et al., "Ferromagnetism Induced by Intrinsic Defects and Boron Substitution in Single-Wall SiC Nanotubes", Journal of Physical Chemistry, vol. 115, No. 35, pp. 9987-9992 (Sep. 8, 2011).
Gan, Structural assessment of nanocomposites, Micron 43 (2012) pp. 782-817.
Ares et al. Columnar-to-Equiaxed Transition in Metal_matrix Composites Reinforced with Silicon Cabide Particles, Hindawi Publishing Corporation, Journal of Metallurgy, vol. 2013, Article ID 628495, 12 pages.
Glazoff et al., "Morphological Analysis of Zirconium Nuclear Fuel Rods Braided with SiC: Qality Assurance and Defect Identification", Journal of Nuclear Materials, 451.1 (Apr. 12, 2014) (pp. 216-224).
Wang et al., "UV Laser-Assisted Diamond Deposition", Nov. 2014 (100 pages), http://digitalcommons.uni.edu/cgi/viewcontent.cgi?article=1068&context=elecengtheses.
Luo et al. Microstructure, tensile strength and thermostability of W-core SiC fibers with or without carbonb coating, Materials Science & Engineering a 647 (2015) pp. 265-276.
Wang et al., "Synthesis of ZrC—SiC Powders from Hybrid Liquid Precursors with Improved Oxidation Resistance", Journal of the American Ceramic Society, vol. 98, No. 1, Jan. 2015 (pp. 197-204).
Jiang et al., "Fabrication of Barium-Strontium Aluminosilicate Coatings on C/SiC Composites via Laser Cladding", Journal of Materials Science & Technology, vol. 33, No. 2, Dec. 23, 2016 (pp. 167-168, 171).
Zimmerman et al. Fragmentation-driven grain refinement in directional solidification of AiCu10wit-% alloy at low pulling speeds, Acta Materialia 126 (2017) pp. 236-250.
Harrison et al., "High Temperature Glass-Ceramic Matrix With Embedded Reinforcement Fibers", U.S. Appl. No. 16/011,698, filed Jun. 19, 2018 (39 pages).
Pegna et al., "Functional High-Performance Fiber Structure", U.S. Appl. No. 16/019,839, filed Jun. 27, 2018 (64 pages).

\* cited by examiner

| MATERIAL | DENSITY (g/cm³) | CTE (10⁻⁶ K @ 293K) | INTRA-PLANE BOND ENERGY (kJ/mol) | INTER-PLANE BOND ENERGY (kJ/mol) | SHEAR STRENGTH (MPa) | SHEAR MOD. (GPa) | TENSILE STRENGTH (MPa) | TENSILE MOD. (GPa) | SOURCE | REMARKS |
|---|---|---|---|---|---|---|---|---|---|---|
| PyC | 1.9-2.3 | 6.5", 0.5⁺ | 524 | 7 | 12 | 5⁼ | 5000 | 500 | [a1][a2] | GRAPHITIC |
| hBN | 2.1 | 40",-2.9⁺ | 636 | 17 | 70 | 2⁼ | 600-1000 | 10-30 | [a3][a4] [a5][a6] [a7][a8] | HEXAGONAL |

FIG. 24

HIGH STRENGTH CERAMIC FIBERS AND METHODS OF FABRICATION

CROSS-REFERENCE TO RELATED APPLICATIONS

This application is a divisional of U.S. patent application Ser. No. 14/372,085, filed Jul. 14, 2014, entitled "HIGH STRENGTH CERAMIC FIBERS AND METHODS OF FABRICATION", which was published as U.S. Patent Publication No. 2015/0004394 A1, on Jan. 1, 2015. U.S. patent application Ser. No. 14/372,085 is a continuation of PCT Application No. PCT/US2013/022053, filed Jan. 18, 2013, which was published WO 2013/180764 A1 on Dec. 5, 2013. PCT Application No. PCT/US2013/022053 claims priority to the following three (3) previously filed U.S. Provisional Patent Applications:

- U.S. Provisional Application No. 61/588,733, filed Jan. 20, 2012, entitled "METHOD AND APPARATUS FOR LARGE SCALE MANUFACTURING OF HIGH STRENGTH CERAMIC FIBERS USING A PLURALITY OF CONTROLLABLE LASERS";
- U.S. Provisional Application No. 61/588,765, filed Jan. 20, 2012, entitled "NON-BRIDGING IN-SITU BORON NITRIDE COATING OF SILICON CARBIDE FIBERS IN CERAMIC MATRIX COMPOSITE MATERIALS"; and
- U.S. Provisional Application No. 61/588,788, filed Jan. 20, 2012, entitled "NANOCOATING SYSTEMS FOR HIGH PERFORMANCE FIBERS FOR DIRECTING MICRO-CRACKS AND ENDOWING MATRIX COMPOSITES WITH AN IMMUNE RESPONSE TO MICRO-CRACKING AND OXIDATION".

Each of the above-noted applications is hereby incorporated herein by reference in its entirety.

STATEMENT REGARDING GOVERNMENT RIGHTS

Certain aspects of this invention were made with United States Government support under Contract No.: NNX11CD80P, awarded by NASA, as well as Contract Award ID No.: 1046412, awarded by the National Science Foundation (NSF). Accordingly, the U.S. Government has certain rights in this invention.

TECHNICAL FIELD

The present inventions relate to unique ceramic matrix composite materials, high performance ceramic and other inorganic fibers, and methods of their manufacture.

BACKGROUND OF THE INVENTION

High Performance Fibers (HPFs) are being proposed for expanding uses in many specialized applications, such as military and aerospace (turbo machinery, rockets, advanced structures), automobile, biomedical, energy, and other applications that require advanced materials with exceptional strength, stiffness, heat resistance, and/or chemical resistance. HPFs are sought when a combination of extreme material properties is required which cannot be met by existing metal filaments or by carbon, glass, vegetal or mineral fibers. HPF composite systems generally include a plurality of coated fibers, distributed within a "matrix."

In most cases currently, fiber formation is accomplished by passing a liquid precursor through a spinneret. For example, FIG. 1 is a schematic representation of a spinneret, a plate with a pattern of tiny holes through which a liquid precursor is fed. Upon exit, the stream pattern gels into filaments called "green fibers". The present inventors have concluded, however, that a better approach involves extracting fiber out of a laser focus where the fiber is created from surrounding fluid precursors. A laser is focused on the fiber tip thereby heating the fiber to temperatures at which the precursors dissociate and Chemical Vapor Deposition (CVD) takes place. The fiber grows in length and is pulled out of the reaction zone at the growth rate, resulting in the creation of an arbitrarily long monofilament fiber. This process technology is illustrated by FIG. 2. FIG. 2 is a schematic of an exemplary process as follows including a reactor 10; enlarged cutout view of reactor chamber 20; enlarged view of growth region 30. A self-seeded fiber 50 grows towards an oncoming coaxial laser 60 and is extracted through an extrusion microtube 40. CVD precursors are injected into the reaction zone from the extrusion microtube forming a small high concentration plume around the reaction zone that feeds and convectively enhances growth. This plume is embedded in a coaxial flow of inert gas that shields the reaction and carries away diluted by-products. This reactor design builds upon understanding of Laser Induced Chemical Vapor Deposition (LCVD) fiber growth. It provides a unique and valuable materials science laboratory, suited for rapid experimental development of specialty filaments. It may be, however, unfit for large scale manufacturing.

As in the microelectronics fabrication industry, where features are massively replicated using optical (photolithographic) methods, large scale replication of fiber growth is herein proposed. Pure optical parallelization for fiber growth is one approach to mass production of fibers. For example, a parallelization of the process technology illustrated by FIG. 2 can be pursued.

In pursuing large scale manufacturing objectives, however, certain features of the FIG. 2 approach should be preserved, such as:

Feature 1—Convection enhanced high-pressure precursor flow—has been shown to optimize single fiber growth.

Feature 2—Imaging at wavelengths that are specific to byproducts (e.g. Hydrogen at 656 nm)—provides for direct observability of fiber growth and has been used for process control.

Feature 3 and 4 respectively—Containerless and Material-agnostic—form the basis for a platform technology capable of processing a wide range of materials.

A legitimate approach to laser foci multiplication is diffraction gratings. Diffraction gratings represent a well-established technology, present even in consumer items such as laser pointers, where they have the ability to generate a multitude of patterns. But if generating a prescribed pattern is commonplace, generating a large number of high quality, evenly distributed foci is a much harder problem, to which the present invention is directed.

SUMMARY OF THE INVENTION

The shortcomings of the prior art are addressed, and additional advantages are provided, by the present invention which in one aspect is a method and apparatus for forming a plurality of fibers from precursors, including a reactor adapted to grow a plurality of individual fibers; and a plurality of independently controllable lasers, each laser of the plurality of lasers growing a respective fiber of the plurality of fibers. The reactor and lasers may grow the fibers according to Laser Induced Chemical Vapor Deposition. The plurality of lasers in one embodiment comprises Quantum Well Intermixing (QWI) lasers.

In another aspect, discussed further below, the present invention in one aspect is a high performance fiber (HPF) structure, including a plurality of fibers arranged in the structure; a matrix disposed between the fibers; wherein a multilayer coating is provided along the surfaces of at least some of the fibers. The multilayer coating includes: an inner layer region having a sheet-like strength; and an outer layer region, having a particle-like strength, such that any cracks propagating toward the outer layer from the matrix propagate along the outer layer and back into the matrix, thereby preventing the cracks from approaching the fibers.

In another aspect, discussed further below, the present invention in one aspect is a method of forming an interphase in a ceramic matrix composite material having a plurality of SiC fibers, which maximizes toughness by minimizing fiber to fiber bridging, including arranging a plurality of SiC fibers into a preform; selectively removing (e.g., etching) silicon out of the surface of the fibers resulting in a porous carbon layer on the fibers; and replacing the porous carbon layer with an interphase layer (e.g., Boron Nitride), which coats the fibers to thereby minimize fiber to fiber bridging in the preform.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed at the conclusion of the specification. The foregoing and other objects, features, and advantages of the invention are apparent from the following detailed description taken in combination with the accompanying drawings in which:

FIG. 18 is a high resolution SEM image of a polished cross-section showing the remaining layer of nanoporous carbon with an overlay of Al—ON;

FIG. 24 shows properties of sample interphase material.

DETAILED DESCRIPTION OF THE INVENTION

Disclosed below are inventions related to the above-incorporated U.S. Provisional Patent Applications entitled:
  I. Method And Apparatus For Large Scale Manufacturing Of High Strength Ceramic Fibers Using A Plurality Of Controllable Lasers—A method and apparatus for forming a plurality of fibers from (e.g., CVD) precursors, including a reactor adapted to grow a plurality of individual fibers; and a plurality of independently controllable lasers, each laser of the plurality of lasers growing a respective fiber of the plurality of fibers. The reactor and lasers may grow the fibers according to Laser Induced Chemical Vapor Deposition. The plurality of lasers in one embodiment comprises Quantum Well Intermixing (QWI) lasers
  II. Nanocoating Systems For High Performance Fibers For Directing Micro-Cracks And Endowing Matrix Composites With An Immune Response To Micro-Cracking And Oxidation—A high performance fiber (HPF) structure, including a plurality of fibers arranged in the structure; a matrix disposed between the fibers; wherein a multilayer coating is provided along the surfaces of at least some of the fibers. The multilayer coating includes: an inner layer region having a sheet-like strength; and an outer layer region, having a particle-like strength, such that any cracks propagating toward the outer layer from the matrix propagate along the outer layer and back into the matrix, thereby preventing the cracks from approaching the fibers. In one embodiment, the inner layer region acts as an oxygen barrier for the fiber, and wherein, upon exposure to oxygen, at least a portion of the outer layer region converts into an oxygen barrier similar to the inner layer region, thereby providing greater protection to the fiber.

III. Non-Bridging In-Situ Boron Nitride Coating Of Silicon Carbide Fibers In Ceramic Matrix Composite Materials—A method of forming an interphase in a ceramic matrix composite material having a plurality of SiC fibers, which maximizes toughness by minimizing fiber to fiber bridging, including arranging a plurality of SiC fibers into a preform; selectively removing (e.g., etching) silicon out of the surface of the fibers resulting in a porous carbon layer on the fibers; and replacing the porous carbon layer with an interphase layer (e.g., Boron Nitride), which coats the fibers to thereby minimize fiber to fiber bridging in the preform.

Any of the techniques, methods, and/or products disclosed in any of the above Applications can be used in combination with the techniques, methods, and/or products of any of the other Applications, and such combination(s) fall within the scope of the present invention. For example, LCVD can be used to apply the coatings, after the fibers have been formed, while the fibers are still in a parallel configuration.

Figure 3:
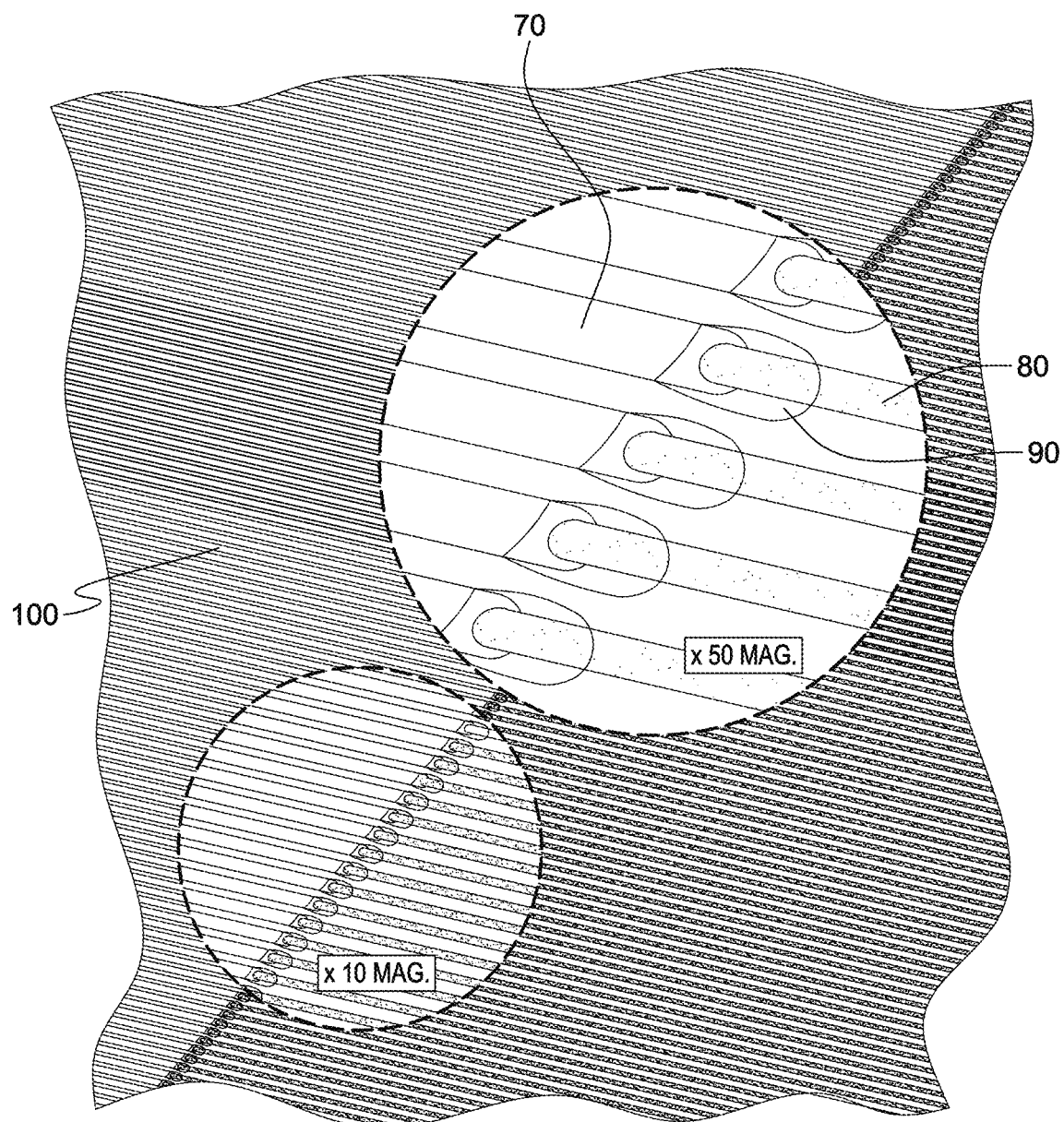
FIG. 3 is a schematic view showing how, in accordance with the present invention, fiber LCVD is massively parallelized by multiplication of the laser beams.

I. Method and Apparatus for Large Scale Manufacturing of High Strength Ceramic Fibers Using a Plurality of Controllable Lasers The present invention, in one embodiment, is the use of a large array of independently controlled lasers, growing an equally large array of fibers 80 in parallel, as illustrated in FIG. 3, showing how fiber LCVD can be massively parallelized from a filament lattice 100 by multiplication of the laser beams 80 inducing a plasma 90 around the tip of each fiber 80.

Figure 4:
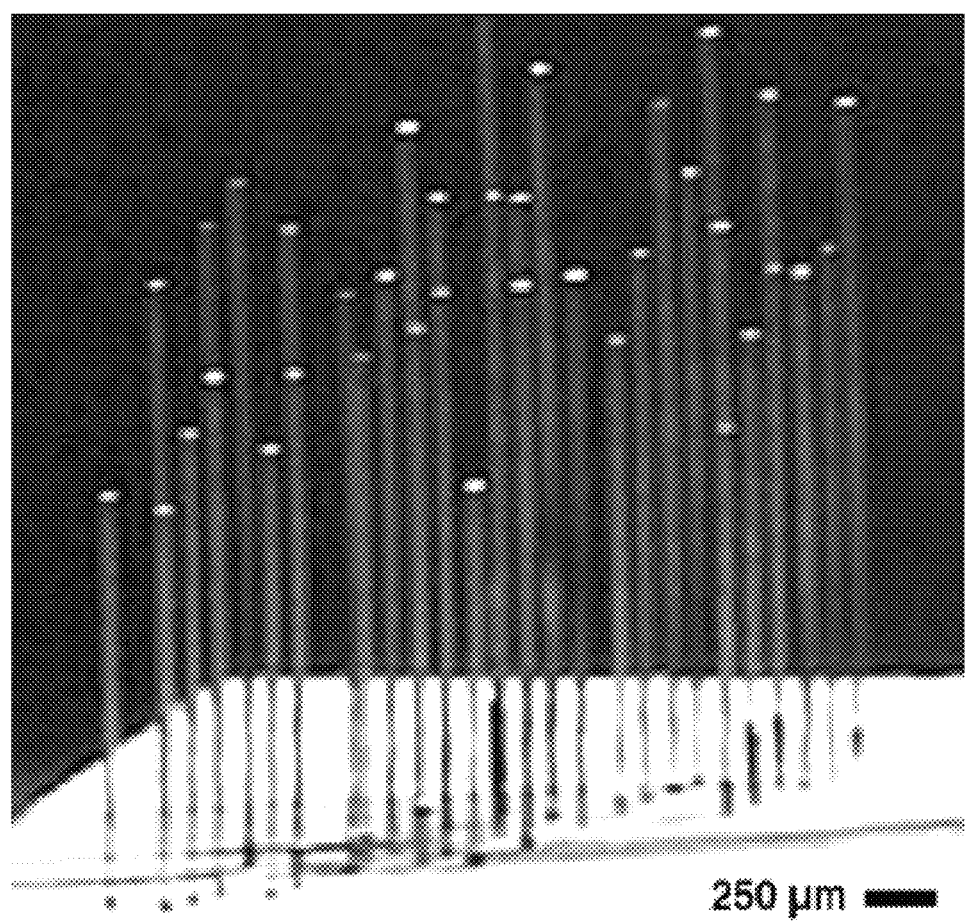
FIG. 4 shows a 7×7 array of carbon fibers grown in parallel.

As discussed above, generating a conventional laser lattice from a single optical source can be effected using commercial diffraction gratings. Commercial diffraction gratings can generate a wide range of custom patterns including the desired linear array. Using a diffraction pattern to grow fibers by LCVD was also demonstrated earlier by Maxwell, J. L. et al., Diamond & Related Materials 16 (2007) 1557-1564 which is hereby incorporated by reference herein in its entirety. A resulting fiber array is shown in FIG. 4, a 7×7 array of carbon fibers grown in parallel by LCVD. The multiple foci are created by running a source laser beam through a diffraction grating, thus creating an array of "beamlets", each growing a fiber. Note the uneven growth heights likely due to uneven power distributions and long focal Rayleigh range.

One difficulty in generating a large linear focal array using a diffraction grating is obtaining a uniform pattern, both in terms of geometry and irradiance. Additionally, diffraction gratings are inefficient at power transmission. A large focal array solution would therefore require a high quality custom grating and a high-power, well collimated expanded source laser.

Figure 5:
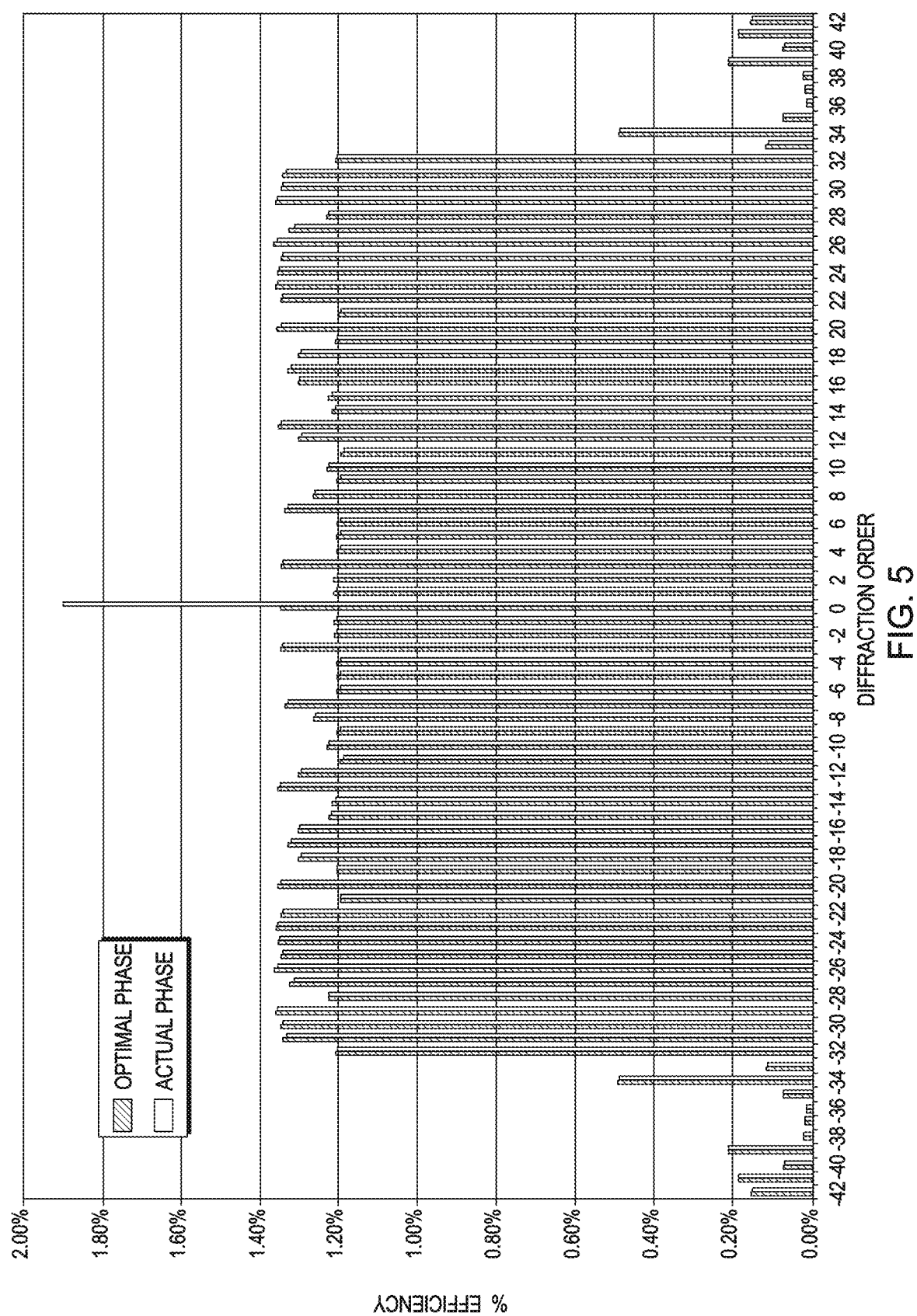
FIG. 5 is a graph of sample diffraction grating efficiency vs. diffraction order.

For example, the result of a sample simulation optimized for a wavelength of 1.064 µm and a beam expanded to 8.1 mm is shown in FIG. 5, a sample diffraction grating simulation of efficiency vs. diffraction order optimized for the following design specifications: number of foci: 60; focus parameters: 100-250 mW, waist diameter: 12.5 Rayleigh range (Depth of focus): 920 focal point distribution: center to center distance: 150 µm; Focal length: 55 mm, Wavelength: 1.064 µm. input beam diameter: 8.1 mm. This shows an average power variation focus to focus of ±12%, with an overall efficiency of 78%. The source beam would need to be expanded about four times and spatially filtered to meet the grating's input beam requirements. Implementing such a solution would therefore require a high quality source laser rated at 20 to 40 W with about 5 W dissipated in the diffraction grating. The spatial filter adds an additional, even greater, power loss. While the relative foci uniformity might have been able to support LCVD growth, the cost of optics and laser ran around $18-$25/mW—well outside of a reasonable budget.

Moreover, the unevenness of focus-to-focus power distribution may cause fibers to grow at different rates. Combined with the long Rayleigh range of diffraction limited optics, this would likely lead to fibers growing to different lengths and diameters as well. Fibers growing at different rates to different lengths is likely to have caused the disparity exhibited by the fibers in the 7×7 array of FIG. 4. Simulations such as that of FIG. 5 indicate that the unevenness of focus-to-focus power intensities will worsen as the number of foci is increased.

In accordance with the present invention, physical replication of the laser emitter itself is disclosed. The focal array should meet requirements of high power density and small size. With single source laser, including the diffraction grating approach discussed above, this can be accomplished by starting from a collimated beam. Hence, for multiple independent lasers, then these lasers should either produce beams that are collimated well enough to produce foci that are near the diffraction limit, or if the beams are not collimated, the source must approximate a point source well enough for its image to produce a high power intensity. The former could be achieved for example by an array of laser fibers. Alternatively, multiple laser diodes on a single microelectronics chip are a candidate, however, such laser diodes may have their own problems which made them unlikely candidates as an optical power source for LCVD. Laser diodes typically have a large divergence angle counted in degrees, if not tens of degrees. To compound the problem, laser diodes emit over large areas—hundreds, if not thousands of $\mu m^2$, far from the point source delivered by a spatial filter. Laser diodes can output powers that, in theory, are sufficient for the purpose of LCVD. But their emitter size and beam characteristics are dictated by the power densities that can be tolerated by the lasing medium. Focusing such a diverging beam emitted from a large area is therefore not limited by diffraction, but by geometric optics. Even with short focus, the large numerical aperture of the source limits the power density at the image well below what is achievable with diffraction limited optics.

Quantum Well Intermixing (QWI) was introduced commercially recently. While QWI laser diodes still have large numerical apertures (5° along the horizontal axis and 22° along the vertical axis) and emitters' area are in the hundreds of $\mu m^2$, the emitter's material formulation raises the maximum laser intensity by significantly decreasing dissipation. As a result, the power density at the focus is high enough for engraving applications. Indeed, this type of laser array quickly found a niche in the Computer to Plate (CtP) industrial printing industry. This also makes it a viable candidate for LCVD.

Figure 6:
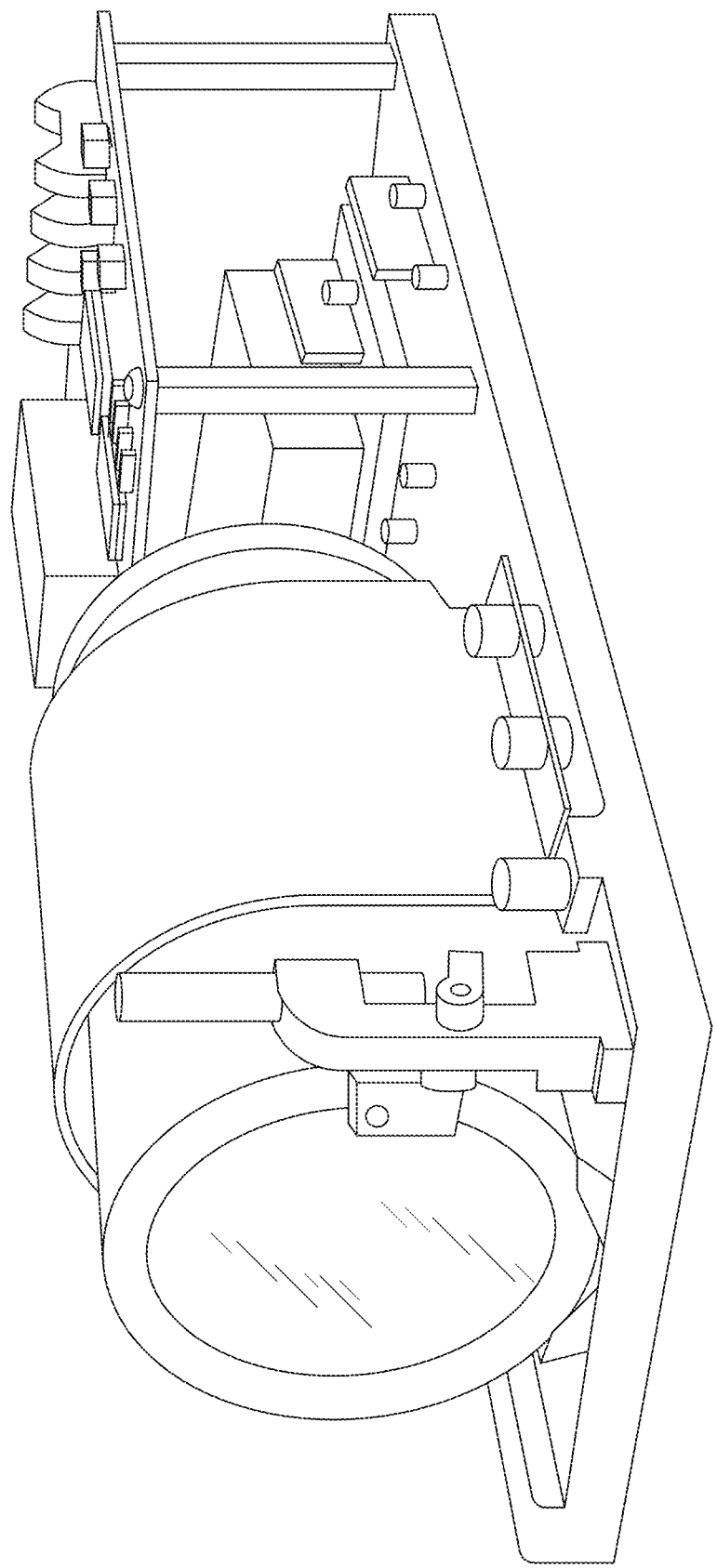
FIG. 6 is an example laser bar module including 64 individually controlled laser emitters in accordance with the present invention.

Such laser diode arrays developed for the printing press industry—computer to plate (CtP) printing—deliver a large number of beams for about $0.65/mW; a 30-40 fold improvement over diffraction gratings. One such laser source (bar module) is shown in FIG. 6, available from Intense, Limited. This unit features 64 individually controlled laser emitters imaged through a 110 mm F.L. into a 12.5 µm×4.5 µm (Vert.×Hz.) Gaussian spots with a 190/230 µm dual pitch. The depth of focus (equivalent to the Rayleigh range for diffraction limited optics) is 200 µm×30 µm (Vert.×Hz.). Each beam max laser power is 260 mW.

The large numerical aperture laser source allows diodes that can sustain extremely high optical powers that would otherwise quickly destroy the lasing medium. The emitting window can therefore be a very narrow, very intense slit, which is then imaged about 1:1 through 110 mm focal length optics.

This laser array delivers 64 zero to 200 mW beams at 830 nm. Also in accordance with the present invention, and contrary to diffraction gratings, the beams are individually controllable, e.g., with their powers individually controllable. Individual laser sources are not collimated so the spot size is not limited by diffraction but geometric optics. In this instance individual laser diodes present a large numerical aperture along the vertical axis, and a narrow one along the horizontal one. The laser sources are imaged through a 110 mm focal length into focal spots uniformly spaced with a 190/230 µm dual pitch. The depth of focus is anisotropic and shallow as a result of optical imaging. At 200 µm×30 µm (vertical×horizontal) the depth of focus is 5 to 30 times shallower than the diffraction limited depth of focus of the grating.

Figure 7:
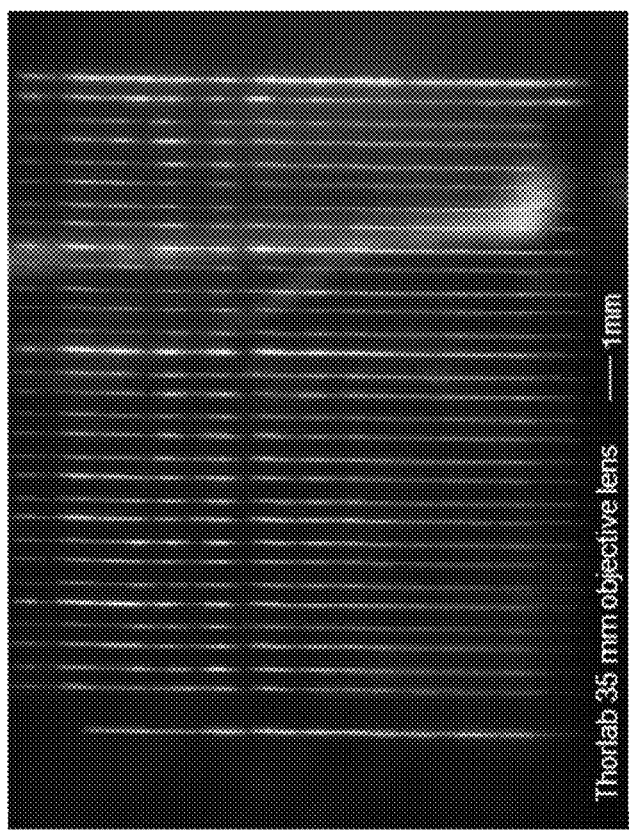
FIG. 7 shows parallel LCVD growth of carbon fibers using the module described in FIG. 6, in accordance with the present invention.
Figure 7:
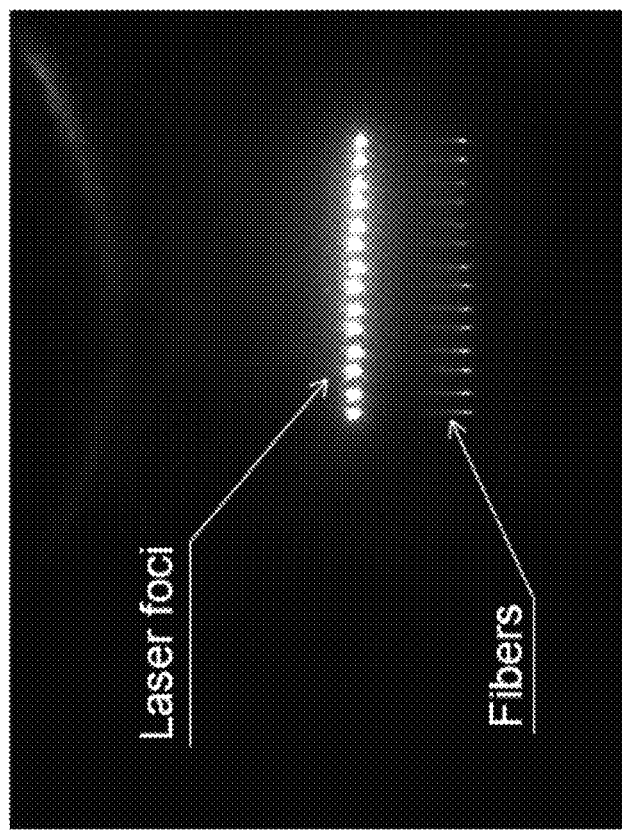

Using a CtP (e.g., QWI) laser array for LCVD is a scientific first, and so was the use of a shallow depth of focus. It provides very beneficial results. Sample carbon fibers, such as those shown in FIG. 7, were grown in parallel. FIG. 7 shows parallel LCVD growth of carbon fibers using the unit described in FIG. 6. Left: Fibers during growth. Right: Resulting free standing fibers 10-12 µm in diameter and about 5 mm long.

In all prior instances the beam was focused to a diffraction limited spot with long Raleigh range. In accordance with the present invention, not only is the focus intense enough to sustain CVD, but the shallow depth of field means that fibers could only grow in a small region in the front and back of the image plane. This goes against commonly accepted practice in LCVD where long depths of field are favored to maximize the growth region. The advantage of a shallow depth of field is important because of the level of control it could afford. For example, if one fiber stopped growing for any reason, the focus can be moved back to that fiber tip. All other growths would stop and then restart as the lagging fiber was pulled back to the same level as the others.

The effect of a shallow depth of focus is indeed remarkable when comparing the fiber array grown by Maxwell et al. shown in FIG. 4 to the linear array shown in FIG. 7. The uneven focus-to-focus power distribution of diffraction gratings combined with the long depth of focus of diffraction limited optics prevents any control over the position of the growth front.

Another major benefit is evident when comparing the fibers in FIG. 7 to those grown by Maxwell et al. in FIG. 4: Fibers grow in unison, and to the same height. This was an unexpected benefit of source imaging over diffraction limited optics because the depth of focus is 5 to 30 times (vertical and horizontal respectively) shallower than the Rayleigh range of an equivalent diffraction limited focus. This turns out to be a huge advantage as fibers quickly grow in and out of focus. This makes it possible to track fiber growth, and even backtrack to retrieve fibers that stopped growing without affecting any of the other already grown fibers. This unique feature of the CtP laser bars is expected to represent a major advantage in controlling future parallel LCVD growth for fiber arrays.

In summary, the present invention is a method and apparatus for forming a plurality of fibers from (e.g., CVD) precursors, including a reactor adapted to grow a plurality of individual fibers; and a plurality of independently controllable lasers, each laser of the plurality of lasers growing a respective fiber of the plurality of fibers. The reactor and lasers may grow the fibers according to Laser Induced Chemical Vapor Deposition. The plurality of lasers in one embodiment comprises Quantum Well Intermixing (QWI) lasers.

Any of the above methods, products, or products resulting from said methods, fall within the scope of the present invention.

This invention is expected to find an important place in all high and ultra-temperature applications such as rocket nozzles, hypersonic domes, jet engines, power generation, high-efficiency internal combustion engines, and armor applications. Anticipated impact is economic: Improved performance, more affordable SiC—SiC composite materials.

I. Nanocoating Systems for High Performance Fibers for Directing Micro-Cracks and Endowing Matrix Composites with an Immune Response to Micro-Cracking and Oxidation Polymer Matrix Composites (PMCs) are commonly used in lightweighting applications at room temperature. Metal Matrix Composites (MMCs) were developed for the same purpose and can withstand higher temperatures compatible with the metal matrix. For yet higher temperatures, especially in oxidizing environments, Ceramic Matrix Composites have been challenging researchers in industry, academia, and government for the last three decades. Reinforcement plays a very different role in PMCs and MMCs, as opposed to CMCs. In the former, the matrix acts as a ductile binder between the load carrying fibers. Optimal properties are achieved when there is good adhesion between fibers and matrix. In the latter (CMCs), the matrix is a brittle binder material, often of the same composition as the fibers, yet it must be separate from it to prevent the brittle failure modes characteristic of monolithic ceramics. A ceramic matrix participates in load bearing, yet must be allowed to fail without compromising the structural integrity of the fibers. This difference of behaviors between PMCs/MMCs and CMCs is evident in their failure modes. The former typically fail by delamination, leaving behind a set of tangled fibers between the broken sections. The latter typically fail by matrix cracking with pulled-out fibers. To achieve this result with CMCs, fibers are typically coated with a material serves as a barrier between fiber and matrix, tolerates small amounts of shear, yet is resistant enough to transmit loads between fiber and matrix. The materials for this coating may be, e.g., pyrolytic carbon (PyC) and Boron Nitride (BN). By preventing brittle cracking of the matrix to propagate through the fibers, the coating can turn the ceramic into a damage tolerant composite, increasing its toughness by a factor of 2 to 3, and its strain to failure approximately fifty fold. Another 50% gain in toughness could be gained by making the coating strongly adhesive to the fiber and less so to the matrix, but how to obtain this differential adhesion has so far been a challenge.

Summary:

This invention addresses these problems with a nanocoating design that provides the needed functions. A particular combination of nanocoating materials provides even further benefits. For high temperature conditions, the main source of material damage is oxygen; and a particular combination of nanocoatings is disclosed herein that not only provides the differential adhesion needed, but also transforms itself in the presence of oxygen to locally provide an enhanced level of protection while preserving the shear compliance of the coating.

The present invention shows that it has become increasingly evident that a SiCf—SiC CMC is first and foremost a micromechanical system engineered for failure mitigation, oxidation prevention, and self-healing. The present invention enhances these functions and adds to them an "immune response" as discussed further below. With this new capability, a local detection of oxygen intrusion will mobilize resources to defend against further ingress and leave behind a "scar tissue" that is more resistant to future aggression.

More particularly, the shortcomings of the prior art are addressed, and additional advantages are provided by the present invention which in one aspect is a high performance fiber (HPF) structure, including a plurality of fibers arranged in the structure; a matrix disposed between the fibers; wherein a multilayer coating is provided along the surfaces of at least some of the fibers. The multilayer coating includes: an inner layer region having a sheet-like strength; and an outer layer region, having a particle-like strength, such that any cracks propagating toward the outer layer from the matrix propagate along the outer layer and back into the matrix, thereby preventing the cracks from approaching the fibers.

The inner layer region may comprise graphitic carbon and the outer layer region may comprise pyrolytic carbon; or the inner layer region may comprise hexagonal B-nitride, and the outer layer region may comprise turbostatic B-nitride.

Advantageously, the structure induces a high-density microcracking effect within the matrix, substantially insulating the fiber from propagating cracks.

In another embodiment, the inner layer region acts as an oxygen barrier for the fiber, and wherein, upon exposure to oxygen, at least a portion of the outer layer region converts into an oxygen barrier similar to the inner layer region, thereby providing greater protection to the fiber.

Detailed Description:

Several topics are now described to further define the present invention.

Interphase:

The sliver of material located at the interface between a fiber and the surrounding matrix in a SiC$_f$—SiC CMC is called the "interphase". In its simplest form, the interphase can be, e.g., a thin coating of either Pyrolytic Carbon (PyC) or hexagonal Boron Nitride (hBN). These materials are isoelectronic and exhibit similar crystalline structures. Their properties are summarized in FIG. 24 as Table 1. More elaborate versions of the interphase can be made of alternating layers of PyC or hBN and SiC.

Table 1 shows the intralaminar mechanical properties of the top three interphase candidate materials. Notes: hBN's CTE normal to basal plane remains negative up to 1500° K, Symbols: //intralaminar, +normal, =interlaminar.

Structural Properties:

The interphase may represent only a fraction of 1% of the weight of a CMC, yet it can endow the composite with nearly all of its structural toughness. Under conditions to be discussed here, the interphase may account for as a much as a quadrupling of the ultimate tensile stress and a fifty-fold increase of the strain to failure.

Figure 8:
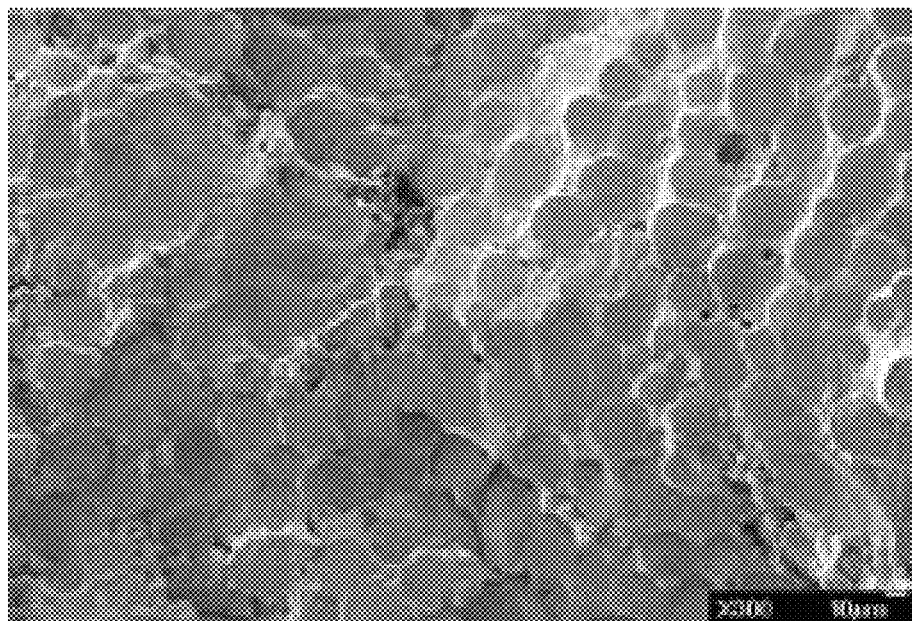
FIG. 8 depicts fractography of a SiCf—SiC CMC fracture surface without interphase.

How such a feat of structural engineering is even possible and how to maximize its benefits has only come to light in the last two decades. In a series of articles, Droillard et al. [a9-a11] showed how the interphase's microscopic workings can have a large macroscopic effect. E.g., without interphase, a CMC may experience the same catastrophic failure a monolithic ceramic does. As soon as a crack develops it propagates through matrix and fiber alike leaving a smooth fracture surface as shown in FIG. 8, which shows fractography of a SiCf—SiC CMC fracture surface without interphase [a12].

Figure 9:
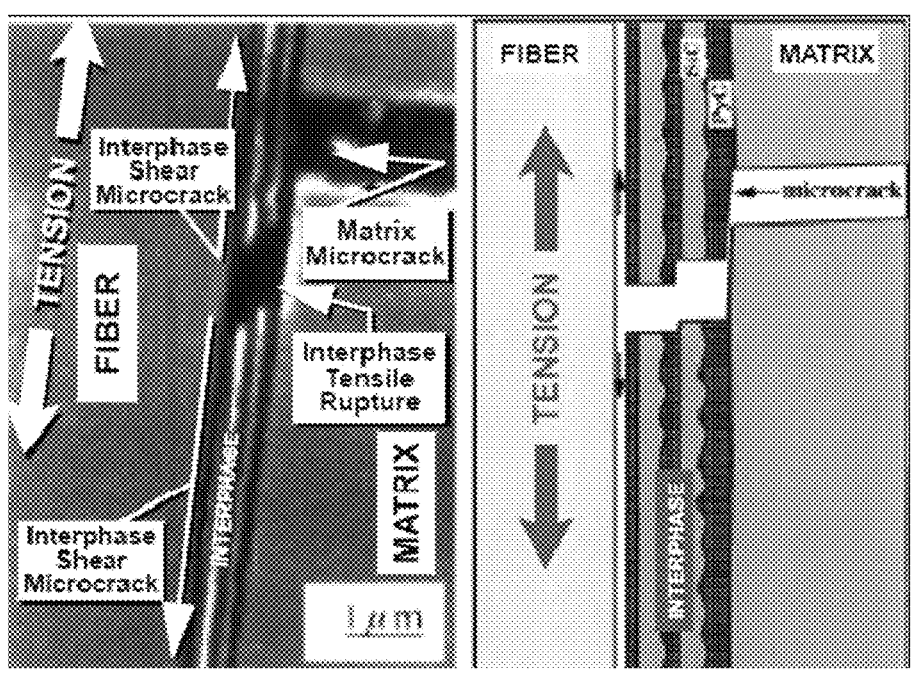
FIG. 9 is an illustration of the effect of a weak fiber-interphase adhesion on CMC failure mechanism.
Figure 10:
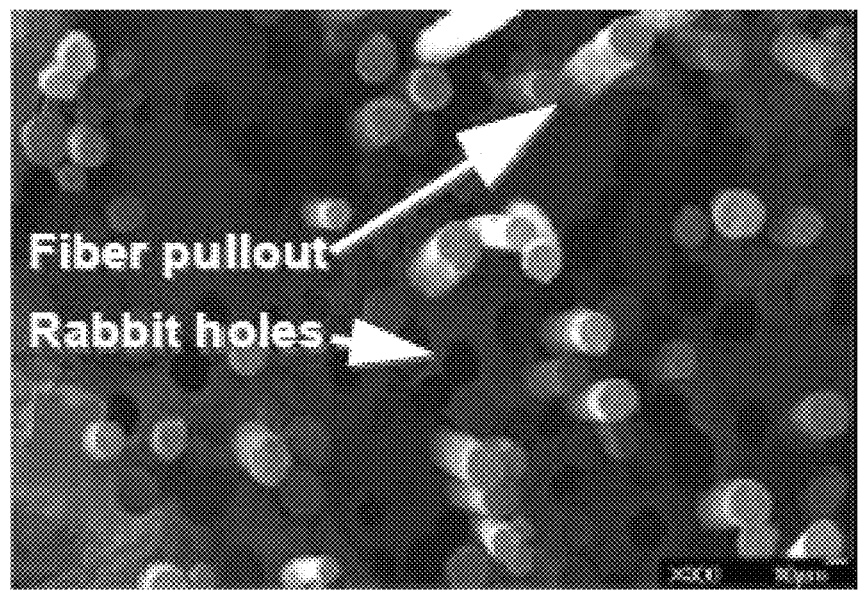
FIG. 10 depicts fractography of SiCf—SiC CMC fracture surfaces with a BN interphase on Hi-Nicalon SiC fibers and PIP infiltrated matrix, exhibiting a pattern of fiber pullouts and "rabbit holes"

A well-designed interphase, such as the dual PyC/SiC layers shown in FIG. 9, may provide a strain energy release mechanism that bifurcates matrix microcracks ("µcracks") into the interphase. FIG. 9 is an illustration of the effect of a weak fiber-interphase adhesion on CMC failure mechanism. A tensile µcrack developed in the Matrix is arrested at the interphase (in this case, 3 alternating layers of PyC and 2 of SiC). After propagating as a shear crack in the outer PyC layer, the interphase ruptures in tension leaving the innermost PyC layer to propagate the shear crack along the fibers' surface [a10]. Once there, µcracks propagate away from their source in shear and in tension respectively along and across the interphase until reaching the fiber's surface. Once at the fiber surface, cracks continue to progress on it, raising the tensile load on the fiber until it ruptures. The broken composite exhibits a large population of fiber "pull-outs" and "rabbit holes" on a cracked matrix background that is relatively smooth as shown in FIG. 10, showing fractography of a SiCf—SiC CMC fracture surfaces with a BN interphase on Hi-Nicalon SiC fibers and PIP infiltrated matrix [a12]. The fracture exhibits a pattern of fiber pullouts and "rabbit holes" expected with matrix macrocracking. With this mechanism, the interphase provides a means to diffuse strain energy that increases the tensile strength by a factor of 2-3 and increases the strain to rupture fifty-fold over monolithic ceramics.

Figure 11:
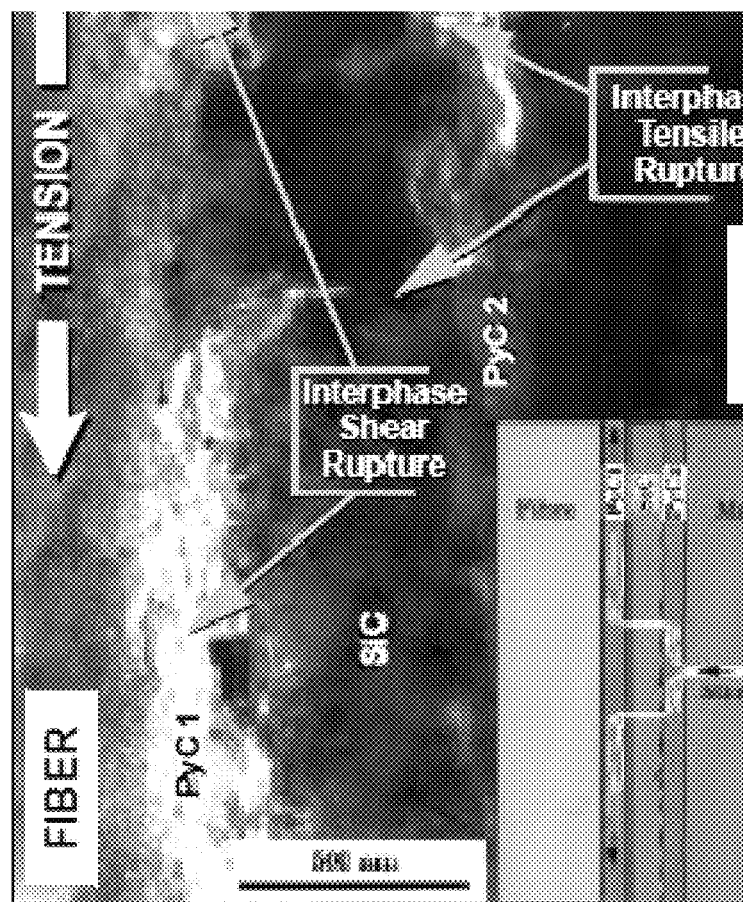
FIG. 11 is an illustration of the effect of a strong adhesion of the innermost layer of the interphase to the fiber.

Droillard et al. [a10] showed that there was still room for a further 50% improvement in tensile strength. They identified the critical importance of µcrack propagation remaining within the interphase layer (as in FIG. 11) as opposed to reaching the fiber's surface (as in FIG. 9). FIG. 11 is an illustration of the effect of a strong adhesion of the innermost layer of the interphase to the fiber. A matrix µcrack is deflected into the outermost PyC layer of the interphase, until the next SiC layer cracks in tension, letting the crack propagate further in shear. The crack propagation continues until it reaches the innermost PyC layer and keeps propagating in it (from [a10]).

A strong adhesion between the innermost interphase layer and the fiber produces this behavior. As µcracks propagate in the interphase, they relieve the original stress concentration in the matrix and redistribute it along the fiber until a new matrix µcrack develops and the cycle starts anew. This behavior drastically transforms the ceramic failure pattern, creating a huge population of new matrix µcracks distributed along the fiber's path while preserving the fiber's structural integrity. Droillard and Lamon [a11] estimate the average distribution of µcracks along the fiber to be between 300 and 1000 cm−1, thus diffusing the strain energy throughout the volume of a CMC. The composite's fracture exhibits the same fiber pullouts and rabbit holes as for a weakly adhesive interphase (FIGS. 9 & 10), but the cracked matrix surface is highly uneven. This modified failure mode represents a higher energy absorption mode, hence the gain in tensile strength. This desirable reaction can be generally referred to as "high density microcracking."

Figure 12:
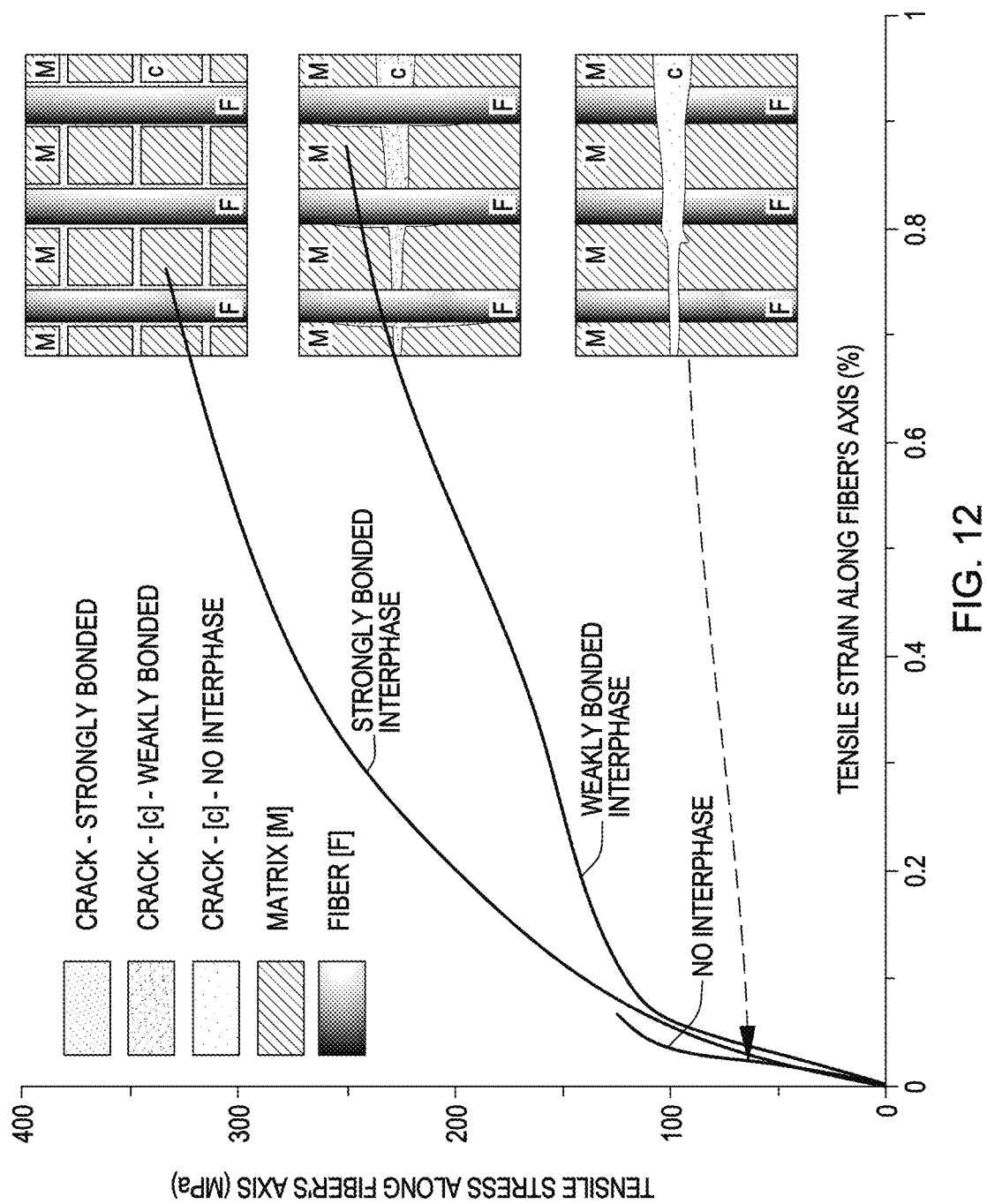
FIG. 12 shows SiCf—SiC CMC tensile curves without interphase, with weakly bonded interphase, and strongly bonded interphase, and corresponding fracture patterns.

Naslain et al. [a13] refer to the function of the interphase as a "[micro]mechanical fuse". This is indeed a good analogy in the sense that the main function of the interphase is to prevent any local overload of the matrix once a µcrack develops in close proximity to a fiber. Interestingly, the thickness of interphase layers does not appear to matter with regard to their micromechanical behavior. Thick layers appear to behave the same as thin layers provided interface bonding are the same [a11]. FIG. 12 provides a comparative summary of all interphase-mediated failure modes. FIG. 12 shows SiCf—SiC CMC tensile curves without interphase, with weakly bonded interphase, and strongly bonded interphase and corresponding fracture patterns (adapted from [a9] and [a10]).

To produce a strong adhesion between fiber and innermost layer of the interphase, Droillard et al. [a10] applied an undisclosed proprietary treatment to the fiber. On the basis of other published reports, this treatment appears to be a de-sizing followed by chlorine-etching of the SiCf s surface [a15]. By the authors' own account, this treatment produces some surface roughness on the fiber's surface, estimated to be between 100 and 150 nm on the basis of published pictures.

In the context of the present inventor's fiber manufacturing, fiber roughness can be adjusted to the desired RMS in production, thereby removing the need for chlorine etching and the fiber damage usually associated with this process [a16]. Furthermore, a shear strength gradient along the interphase radius can be accomplished by varying the degree of crystallization of BN or PyC, from fully crystallized to turbostratic as the radius increases. In the case of BN coatings, this idea will reveal its full potential in view of the thermodynamic implications discussed further below.

Figure 13:
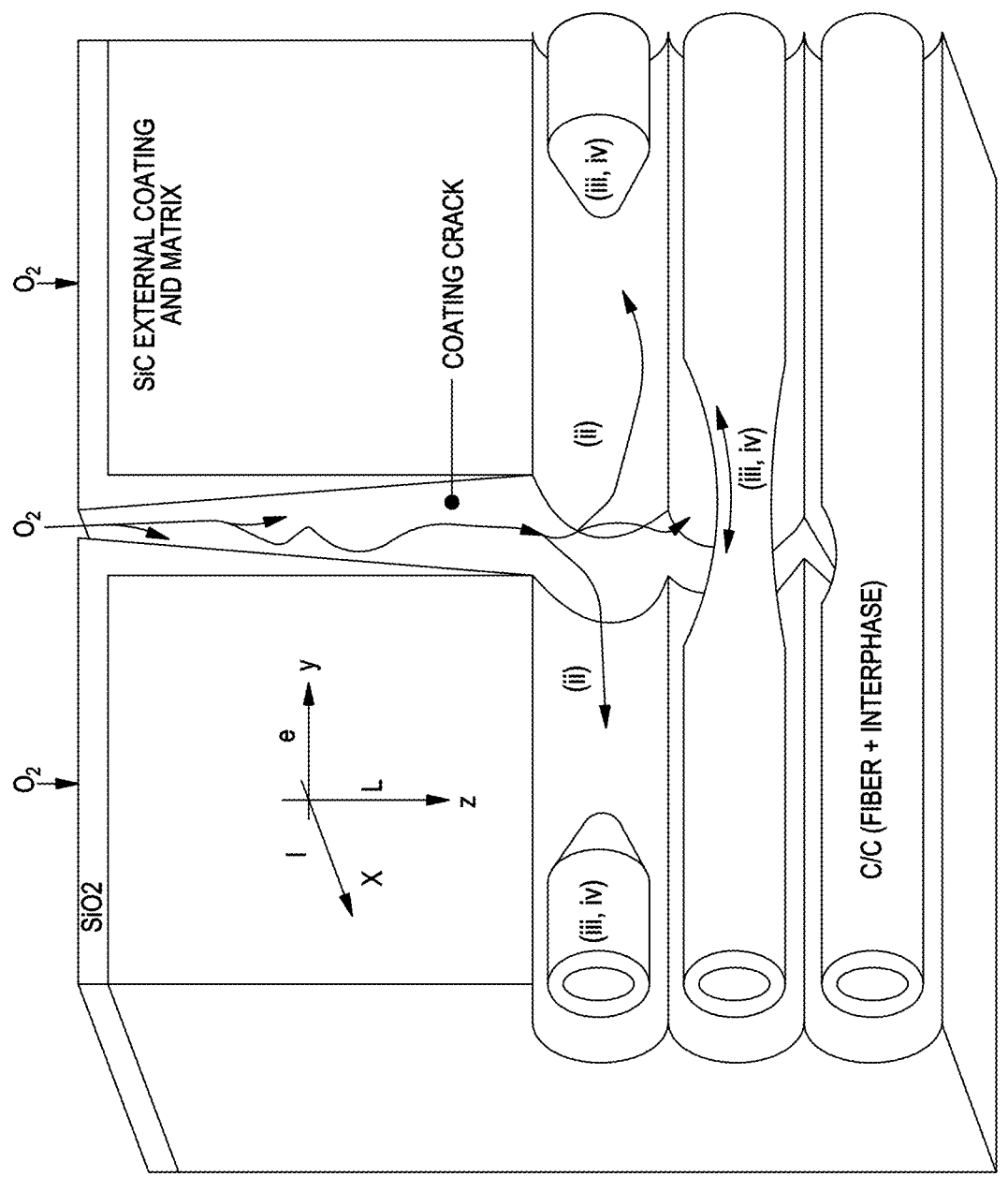
FIG. 13 is an illustration of crack-induced oxidation damage in Cf—SiC CMC.

Oxidative Properties:

Oxidation mechanisms and kinetics of Cf—SiC CMCs, are disclosed by Naslain et al. [a17], from which can be extracted the schematics of crack-induced oxidation damage reproduced in FIG. 13, an illustration of crack-induced oxidation damage in Cf—SiC CMC: (i) diffusion along the SiC-microcracks, (ii) diffusion in the pore created by oxidation of carbon phases, (iii) diffusion of oxygen at carbon surface to reaction sites, (iv) surface reaction, (v) growth of silica on SiC-microcrack wall. Reproduced from [a17].

Alternatively, reference [a18] provides a comprehensive review of the oxidative mechanism of each material in a SiCf—SiC CMC and their co-oxidation. Although FIG. 13 is concerned with carbon fiber reinforced CMC, this picture points out the most critical issue in relation to high-density microcracking: The larger the crack population, the greater the risks of oxidation damage. Hence the price to pay for a greater composite strength would appear to be a greater propensity to oxidation damage. The present invention proposes a nanocoating architecture which can reverse this propensity the same way local immune responses defend against foreign intrusions throughout the body.

For the purpose of this summary, the key oxidative properties of SiC and PyC are discussed, and then the thermodynamic properties of interest for hBN.

Oxidation of SiC:

SiC can be the principal barrier against oxidation. SiC oxidation initially proceeds from depletion of Carbon (released as CO or $CO_2$ gas) and, assuming oxidation is complete, the formation of an $SiO_2$ layer, which remains solid up to 1600° C. (near the melting point of Silica). Deal and Grove [a21]. For CMCs, surface oxidation also confers some self-healing properties due in large part to the molar volume of Silicon being more than doubled upon oxidation ([a13] & FIG. 13). Once a solid $SiO_2$ shield is formed, oxidation proceeds by diffusion of ionic oxygen into $SiO_2$ and diffusion of CO out of it. The oxidation process is therefore mass transport limited, and the oxide layer thickness typically increases as the square root of exposure time. Only if oxidation is incomplete, as is the case at high temperature and low oxygen partial pressure does the reaction become rate limited, depleting Silicon linearly with time as volatile silicon sub-oxide (SiO(g)) [a19][a20].

Oxidation of PyC:

Fully crystallized graphite is thermally stable to 3650° C. but starts to oxidize at 400° C. in air. It exhibits a temperature dependent anisotropic oxidation, which progresses much faster along the edges of the basal planes than across at low temperature [a25]. As temperature increases normal etching catches up to in-plane to equalize in the 750-800° C. range. PyC being a turbostratic graphite, it exhibits a high level of nanoporosity, hence a greater reactivity to oxygen. Delcamp et al. [a15] document nanoporous PyC obtained by chlorine etching of SiC fibers having a staggering specific surface area (open to oxygen) of about 1000 and 1500 m2/g with the consequence that oxidation starts at a temperature as low as 225° C. When carbon oxidizes, it is depleted as CO or $CO_2$ gas, hence oxidation is rate limited and carbon depletion progresses linearly with time. This is a major drawback against using a Carbon interphase or fiber in oxidizing environments.

Oxidation of hBN:

hBN has become the interphase material of choice for high-temperature SiCf—SiC CMC in oxidizing environments. hBN has high thermal conductivity even at elevated temperature (600 and 30 W/m K intralaminar and perpendicular respectively), high electrical resistivity, and high level of chemical inertness. In the absence of oxygen, hBN is believed to sublimate and decompose at ~3000° C. at 100 kPa, although there is indication that it can be melted at atmospheric pressure under a pure nitrogen atmosphere [a26].

Fully crystallized hBN starts oxidizing at 700-800° C. in dry air [a23]. Like graphite, oxidation progresses much faster along the basal planes than in the normal direction [a24], hence turbostratic BN (tBN) also has a porosity-dependent oxidation temperature beginning at ~400° C. Given the similarity between graphite and hBN, it is legitimate to expect similar specific areas. Contrary to graphite, however, oxidation forms a layer of Boria ($B_2O_3$), which remains liquid between 410 and 1200° C. [a27]. Liquid Boria has many attractive properties in the context of CMCs: It has a very low vapor pressure (~0 Pa at 20° C. rising to 1.5 kPa at 1200° C. [a28]), it is an extremely viscous fluid (480 Pa s @600° C. [a29] rising to ~160 $10^3$ Pa s near its freezing point), and it diffuses readily in Silica to form Borosilicate glass (a.k.a Pyrex™) which exhibits the highest silicate glass transition temperature. As a result, Boria (or Borosilicate if in solution) represents a much better solution than carbon to delay oxidation damage. It should be noted however that oxidation of hBN is greatly accelerated in the presence of water vapor, especially in low concentration (~20 ppm) [a17][a24][a30-32].

Thermodynamics of hBN Crystallization:

Fully crystallized hBN synthesis requires an elevated temperature of about 2000° C. Le Gallet et al. [a1], as well as other authors [a33][a34][a35], applied post-process heat treatments at temperatures between 1000 and 1700° C. to CVD'd tBN interphases to convert them into dense hBN. In fact, as CVD temperature approaches 2000° C., the deposited BN approaches full density and stoichiometry. For all practical purposes, stoichiometry appears to be achieved in the range 1800-2000° C. Deposit density also appears to be very sensitive to precursor pressure. BN deposited below 1300 Pa at temperature between 1400 and 2000° C. is fully dense.

As discussed above, BN density has a large influence on oxidation resistance, even in the presence of moisture. The thermogravimetric analysis reported by Matsuda [a32] shows that BN deposited at 650 Pa between 1400 and 2000° C.—fully crystallized hBN—is essentially stable at temperatures up to 800° C. In the context of the proposed "immune system," the influence of oxygen on the crystallization of tBN presents a particularly attractive property. Even in small amounts, Boria ($B_2O_3$) decreases the tBN to hBN transformation temperature from 2000° C. to 1450° C. [a36].

The present invention pertains to a system of nanocoatings for High Performance Fibers (HPFs), which: (1) optimizes the toughness of a ceramic matrix composite, and (2) endows a ceramic matrix composite material with a reaction to oxidation damage that is akin to an immune response by mobilizing resources locally to combat oxygen ingress and build up protection against further oxidation Interphase Design—An immune system for SiCf—SiC CMCs:

In accordance with the present invention, a novel interphase system is disclosed having the following attributes:
An inner interphase layer strongly adhering to, eg., an SiC fiber,
a decreasing shear strength along the interphase radius,
a response to oxidation akin to that of an immune system.

The first two attributes are attained in accordance with the present invention by providing a BN layer with a crystallization gradient, from fully crystallized hBN on the innermost radius, to tBN on the outermost one. This can also be attained with carbon instead of BN, from fully crystallized graphitic innermost, to PyC outermost.

hBN is particularly vulnerable to oxidation along the edges of its basal planes, and tBN even more so, which makes it a de-facto oxygen nanosensor. These edges would be exposed at the ends of the CMC, where the fibers' ends surface out of the matrix, and in case the event of surface µcracking. Hence to minimize the effect of oxygen ingress, we would need to minimize the thickness of BN layers consistent with the shear and fiber roughness requirements.

Even small amounts of Boria—created in the oxidation of tBN—can behave as a nanocatalyst, triggering a low temperature crystallization of the surrounding tBN into hBN. The localized crystallization is expected to form a "scar tissue" with practically no remaining specific surface area exposed to oxygen, hence a greater oxidation temperature and greater resistance to further oxidation.

Figure 14:
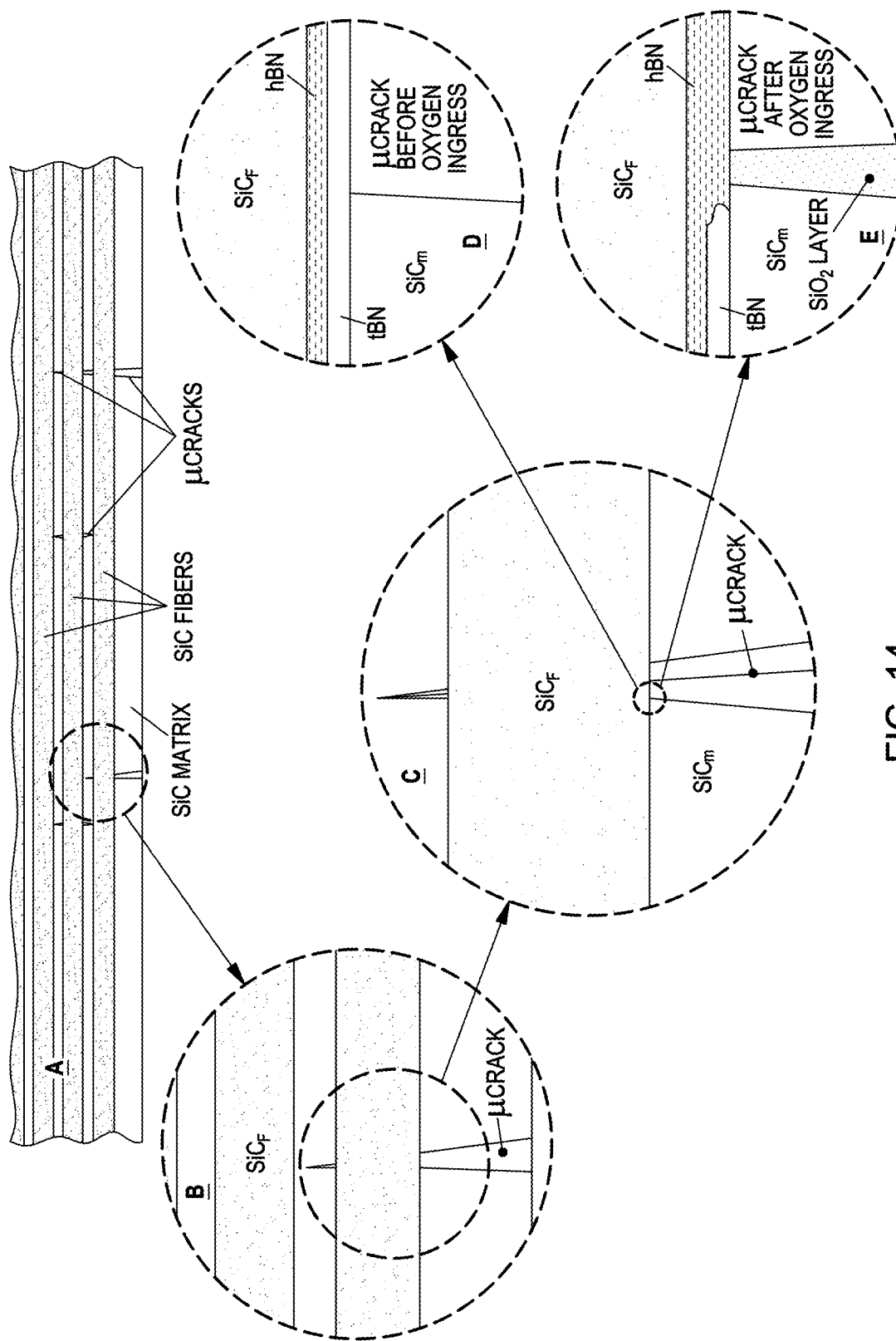
FIG. 14 depicts an exemplary response of the immune system in accordance with the present invention.

In accordance with the present invention, successive nanocoatings, e.g., 25 to 50 nm thick are provided, such that the innermost layer comprises fully crystallized hBN, and the outermost is tBN, can serve to promote matrix µcracking over macrocracking while providing a built-in defense mechanism against oxidation damage. The µcracking behavior increases the composite toughness while the proposed interphase system counters the vulnerability to oxygen. Should a surface µcrack develop, letting oxygen diffuse in, the outer layer of exposed tBN will convert to hBN under the influence of Boria. Once this transformation occurs, the temperature at which oxidation of the interphase starts will be raised by 400° C., and an hBN "scar tissue" will have formed that protects against further oxygen ingress and subdivides the un-cracked section into a minicomposite homomorphic to the original. For increased functionality, these layers could be repeated with layers of SiC interposed between each pair. FIG. 14 summarizes this projected scenario for the proposed CMC's immune response. FIG. 14 shows an exemplary response of the proposed immune system function. A: The interphase system promotes high-density matrix µcracking over macrocracking. B, C: Increasing magnification of a surface matrix µcrack. D: The interphase before exposure to Oxygen consists of a layer of hBN with an overcoat of tBN. E: Upon exposure to Oxygen, the fraction of Boron oxide created acts as a catalyst to locally transform tBN into hBN, causing the oxidation temperature to rise by 400° C. and subdividing the un-cracked section into a mini-composite homomorphic to the original. Meanwhile the crack tends to fill with Silicate/Borosilicate glass.

The present invention will be of interest to all parties with a vested interest in high-temperature structural components. For components expected to be oxidation prone, this includes all internal combustion engines, with a specific near term and pressing interest in jet engines and turbine power generation. The key US primes are aviation and other high performance engine manufacturers. Other major anticipated markets include the nuclear industry where advanced Ceramic Matrix Composite have been identified as a safer (though currently more expensive) alternative to Zircalloy for fuel rods and boxes. (SiC—SiC Ceramic Matrix Composites may have been able to withstand damages and survive the events of Fukishima.)

More particularly the present invention in one aspect is a high performance fiber (HPF) structure, including a plurality of fibers arranged in the structure; a matrix disposed between the fibers; wherein a multilayer coating is provided along the surfaces of at least some of the fibers. The multilayer coating includes: an inner layer region having a sheet-like strength; and an outer layer region, having a particle-like strength, such that any cracks propagating toward the outer layer from the matrix propagate along the outer layer and back into the matrix, thereby preventing the cracks from approaching the fibers.

Fibers may be aligned with multiple orientations, e.g., one layer longitudinal, next layer across, alternatively, fibers can be woven in a 2-d pattern or braided in a 3-D "brick."

The inner layer region may comprise graphitic carbon and the outer layer region may comprise pyrolytic carbon; or the inner layer region may comprise hexagonal B-nitride, and the outer layer region may comprise turbostatic B-nitride.

Advantageously, the structure induces a high-density microcracking effect within the matrix, substantially insulating the fiber from propagating cracks, and increasing toughness.

In another embodiment, the inner layer region acts as an oxygen barrier for the fiber, and wherein, upon exposure to oxygen, at least a portion of the outer layer region converts into an oxygen barrier similar to the inner layer region, thereby providing greater protection to the fiber.

Unique features include: (1) a nanocoating system that locally diverts matrix microcracks within the coating layer and forces them to progress along the fiber thereby displacing stress in the matrix until such time as it cracks again and the cycle starts anew. (2) One type of nanocoating system, when exposed to oxygen at high temperature will convert to another type, thus locally mobilizing resources against oxidation damage in a manner akin to a biological entity's immune system.

Advantages of the present invention include: (1) Nanocoating system maximizes energy absorption capacity of Ceramic Matrix Composite by inducing engineered high-density microcracking of the matrix, thereby increasing toughness and strain to failure. (2) Nanocoating system offers not just self-healing, but also builds up further defense against oxidation damage. Structure between microcracks is homomorphic to original composites with scar tissue in between. This provides a CMC with higher resistance when operating at high temperature under oxidizing environments.

Each of the following documents is hereby incorporated herein by reference in its entirety:

[a1] S. Le Gallet, G. Chollon, F. Rebillat, A. Guette, X. Bourrat, R. Naslain, M. Couzi, J. L. Bruneel; J. Eur. Ceram. Soc. 24 33-44 (2004)
[a2] M Grimsditch, J. Phys. C: Solid State Phys., 16 (1983) L143-L144.
[a3] L. Duclaux, B. Nysten, J-P. Issi, and A. W. Moore, Phys. Rev. B, 46 [6] 3362-3368 (1992)
[a4] I. Hamdi and N. Meskini, Physica B4052785-2794 (2010)
[a5] A. Bosak, J. Serrano, M. Krisch, K. Watanabe, T. Taniguchi, H. Kanda, Phys. Rev. B 73 (2006)
[a6] K. Niedenzu. and J. W. Dawson, Boron-Nitrogen Compounds, Academic Press, New York, 1965.
[a7] Handbook of Chemistry and Physics, 49th edn. The Chemical Rubber Co, 1969.
[a8] D. Li, C. Zhang, B. Li, F. Cao, S. Wang, J. Li, Materials Science and Engineering A 528 8169-8173 (2011)
[a9] C. Droillard, J. Lamon, J. Am. Ceram. Soc. 79 [4] 849-858 (1996)
[a10] S. Bertrand, C. Droillard, R. Pailler, X. Bourrat, R. Naslain, J. Eur. Ceram. Soc. 20 1-13 (2000)
[a11] Droillard, C., Lamon, J. and Bourrat, X., Mat. Res. Soc. Proc., 365, 371-376 (1995)
[a12] H. Wua, M. Chena, X. Wei, M. Ge, W. Zhang, Appl. Surf. Sc. 257 1276-1281 (2010)
[a13] R. Naslain, J. Lamon, R. Pailler, X. Bourrat, A. Guette, F. Langlais, Composites part A—Applied science and manufacturing, 30, p. 537 (1999)
[a14] L. Gibson, M. Ashby, and B. Harley, Cellular Materials in Nature and Medicine, Cambridge University Press (2010)
[a15] A. Delcamp, L. Maine, B. Rufino, S. Mazerat, R. Pailler, A. Guette, P. Weisbecker, H. Plaisantin, E. Philippe, S. Loison; Surface & Coatings Technology 205 (2010) 703-709
[a16] L. Shen, B. J. Tan, W. S. Willis, F. S. Galasso, and S. L. Stuib, J. Am. Ceram. Soc. 77 [4] 1011-1016 (1994)
[a17] R. Naslain, A. Guette, F. Rebillat, S. Le Gallet, F. Lamouroux, L. Filipuzzi, C. Louchet, J. Mat. Sc. 39 7303-16 (2004)
[a18] Pegna, J., NASA SBIR Phase I final report, Contract No. NNX11CD80P (2011)
[a19] D. Starodub, E. P. Gusev, E. Garfunkel and T. Gustafsson, Surface Review and Letters, 6 [1] 45-52 (1999)
[a20] N. S. Jacobson and D. L. Myers, Oxid Met 75, 1-25 (2011)
[a21] B. E. Deal and A. S. Grove, J. Appl. Phys. 36, 3770 (1965)
[a22] K. Oda and T. Yoshio, J. Mat. Sc. 28, 6562-6566 (1993)
[a23] N. Jacobson, S. Farmer, A. Moore and H. Sayir, J. Am. Ceram. Soc., 82 [2] 393-98 (1999)
[a24] N. S. Jacobson, G. N. Morscher, D. R. Bryant and R. E. Tressler, J. Am. Ceram. Soc., 82 [6] 1473-82 (1999)
[a25] A. Delehouzé, F. Rebillat, P. Weisbecker, J-M. Leyssale, J-F. Epherre, C. Labrugere, and G. L. Vignoles, Appl. Phys. Lett. 99, 044102 (2011)
[a26] S. Gleiman, C-K. Chen, A. Datye, J. Phillips, Los Alamos National Laboratory report LA-UR-01-4327 (2001)
[a27] K. N. Lee and R. A. Miller, J. Am. Ceram. Soc, 79 [3], pp. 620-626 (1996)
[a28] F. T. Greene and J. L. Margrave, J. of Phys. Chemistry 70, [7] 2112-15 (1966)
[a29] McBroom, R. C., Trans. Am. Nucl. Soc., v 53, 295-6 (1986)
[a30] M. Sano and M. Aoki, Thin Solid Films 83 247 (1981)
[a31] S. Motojima, Y. Tamura and K. Sugiyama, Thin Solid Films, 88 269 (1982)
[a32] T. Matsuda, J. Mat. Sc. 24 2353-2358 (1989)
[a33] A. Udayakumara, A. Sri Ganesh, S. Raja, M. Balasubramanian, J. Eur. Ceram. Soc. 31 1145-1153 (2011)
[a34] C. Cofer and J. Economy, Carbon, 33 [4], 389-395 (1995)
[35] M. Leparoux, L. Vandenbulcke, and C. Clinard, J. Am. Ceram. Soc, 82 [5], 1187-1195 (1999)
[36] J. Thomas, N. E. Weston, and T. E. O'Connor, J. Am. Chem. Soc, 84 [24], 4619-4622 (1963)

III. Non-Bridging In-Situ Boron Nitride Coating of Silicon Carbide Fibers in Ceramic Matrix Composite Materials High Performance Fibers (HPFs), formed from ceramic matrix composite materials, are being proposed for expanding uses in many specialized applications, such as military and aerospace (turbo machinery, rockets, advanced structures), automobile, biomedical, energy, and other applications that require advanced materials with exceptional strength, stiffness, heat resistance, and/or chemical resistance. HPFs are sought when a combination of extreme material properties is required which cannot be met by existing metal filaments or by carbon, glass, vegetal or mineral fibers. HPF systems generally include a plurality of coated fibers, spaced within a "matrix."

For toughness and oxidation resistance, Silicon Carbide fiber (SiCf) reinforced Silicon Carbide matrix (SiCm) composites may have a layer of interphase material between the fibers and the matrix. One layer material may be Boron Nitride (BN) in turbostratic (tBN) or fully crystallized hexagonal form (hBN). Because of the limitations of SiCf processing, the required interphase coating may be applied to the fiber once they have been preformed, de-sized, and are ready to be infiltrated. This method however results in contact between fibers that results in diffusion welds, known as fiber "bridges," that significantly reduce the mechanical toughness of the resulting composite. The present invention modifies the process to prevent bridging by ensuring the fibers are not in contact during the coating process. The resulting composite material properties are therefore improved by eliminating weak points in the fiber's load carrying structure.

SiCf—SiC composite materials are designed to be load-bearing and oxidation resistant at high temperature. Although the constitutive ceramics are brittle by nature the composite exhibits strength and toughness as a result of micromechanical engineering of the structure, which diverts overloads and stress concentration in order to improve energy absorption. This may be accomplished by the material located between fibers and matrix, called the interphase.

This interphase may play the role of a micromechanical fuse that shears along the fiber to prevent fracture of the matrix. To be able to effectively fulfill its function however, the interphase should be continuous along the fiber. Current manufacturing technology cannot obtain this continuity because fibers are in direct contact. Short of pre-coated SiCf being available, the next best solution is to prevent fiber contact during coating. This is what the present invention achieves, thereby promoting mechanical properties of the composite.

In-Situ Coating of SiC Fibers:

For SiC fibers, in-situ coating processes appear to prevail in industrial applications for lack of a better alternative. Faced with the difficulty of handling and processing bare SiCf tows, industry has opted to work with sized fibers up to the final weaving, braiding, called "preform." Once fibers are placed, they are de-sized (typically by heating to 600° C. for 12 hours), then coated in place, and finally infiltrated with the matrix.

Figure 1:
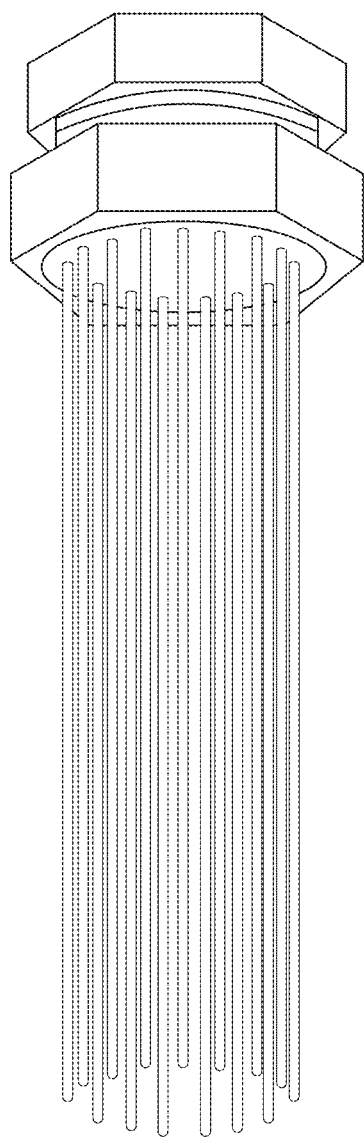
FIG. 1 is a schematic representation of a spinneret, a plate with a pattern of tiny holes through which a liquid precursor is fed, and upon exit, the stream pattern gels into filaments called "green fibers"
Figure 2:
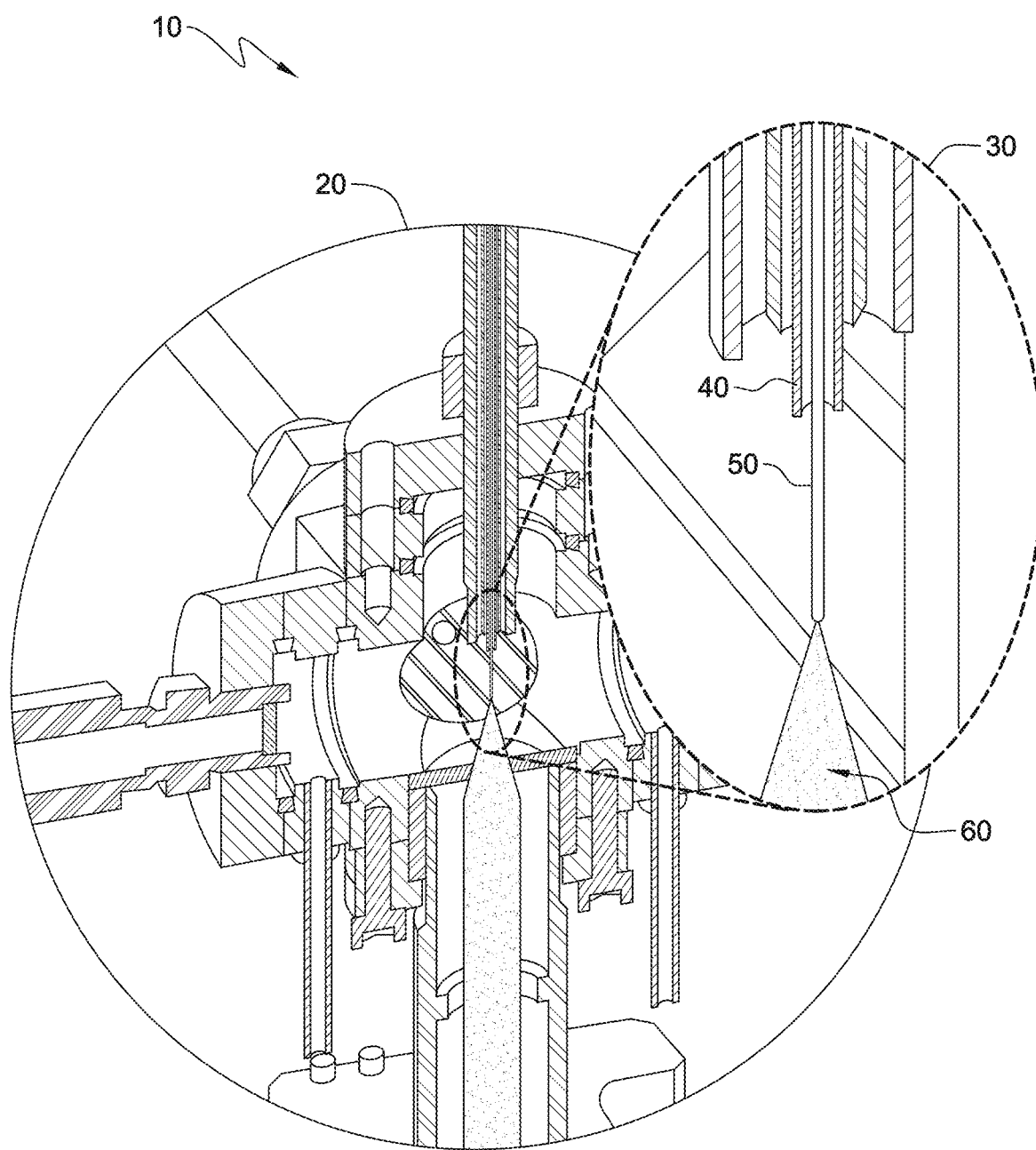
FIG. 2 is a schematic view of an exemplary process for forming a monofilament fiber.
Figure 15:
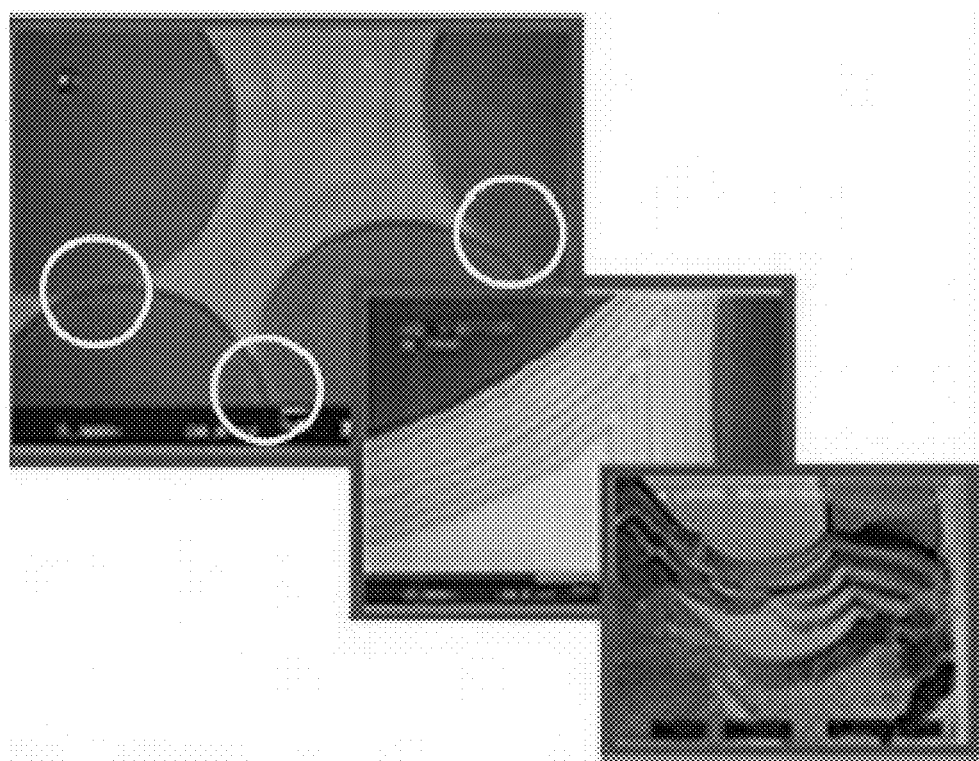
FIG. 15 is an illustration of successive enlargements of multilayer in-situ coatings of SiC fibers.
Figure 16:
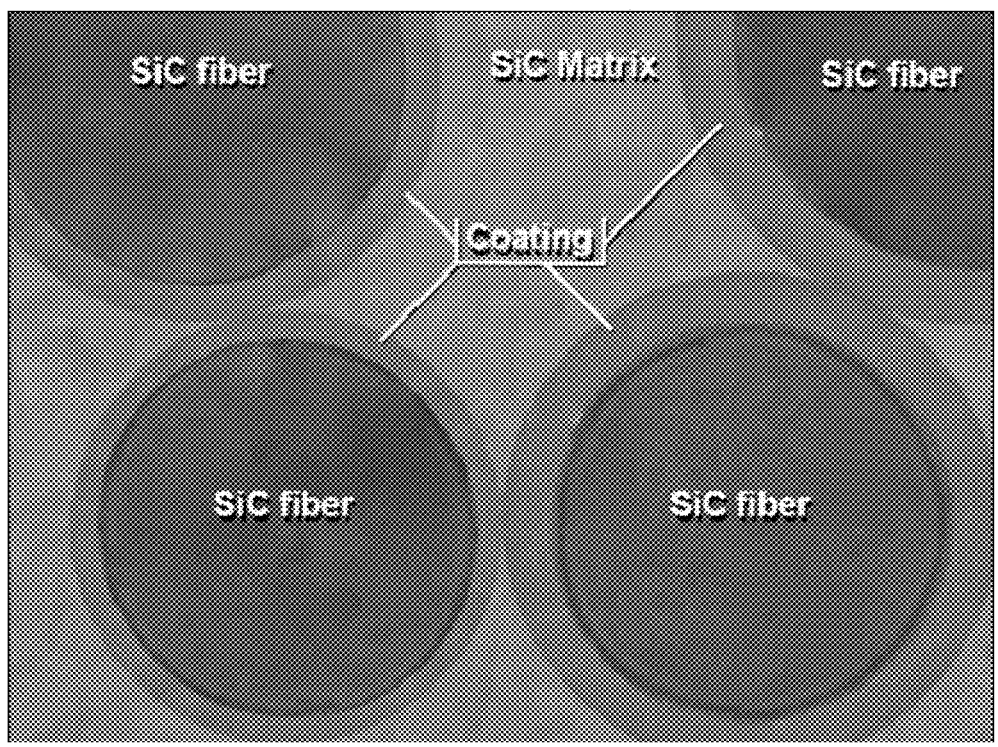
FIG. 16 is an exemplary SEM of in-situ coating showing the desired result of in-situ coatings where fibers are clearly separated, thereby preventing bridging in accordance with the present invention.

Hyper-Therm HTC (Huntington Beach, Calif.), for example, has built a business out of coating fabrics and preforms. FIG. 15 is extracted from a company prospectus [b1]. FIG. 15 shows successive enlargements of multilayer in-situ coatings of SiC fibers (Source: Hyper-Therm HTC [b1]). It illustrates the exquisite level of control that Hyper-Therm has been able to achieve with multilayer coatings. What this picture also illustrates, however, are points of fiber-to-fiber contacts that are a direct result of in-situ coating, where de-sized fibers are allowed to come into direct contact and subsequently bond during the coating process or in high temperature use. Such points are identified with yellow circles in FIG. 1 and are known to cause fiber "bridges" that are highly detrimental to composite strength and toughness. One would instead want to obtain the coated fiber (hypothetical) configuration depicted in FIG. 16, an exemplary SEM of in-situ coating showing the desired result of in-situ coatings where fibers are clearly separated, thereby preventing bridging.

Until the advent of the present invention, this would have been difficult or impossible to obtain given that there are no means to keep the fibers apart after de-sizing.

Figure 17:
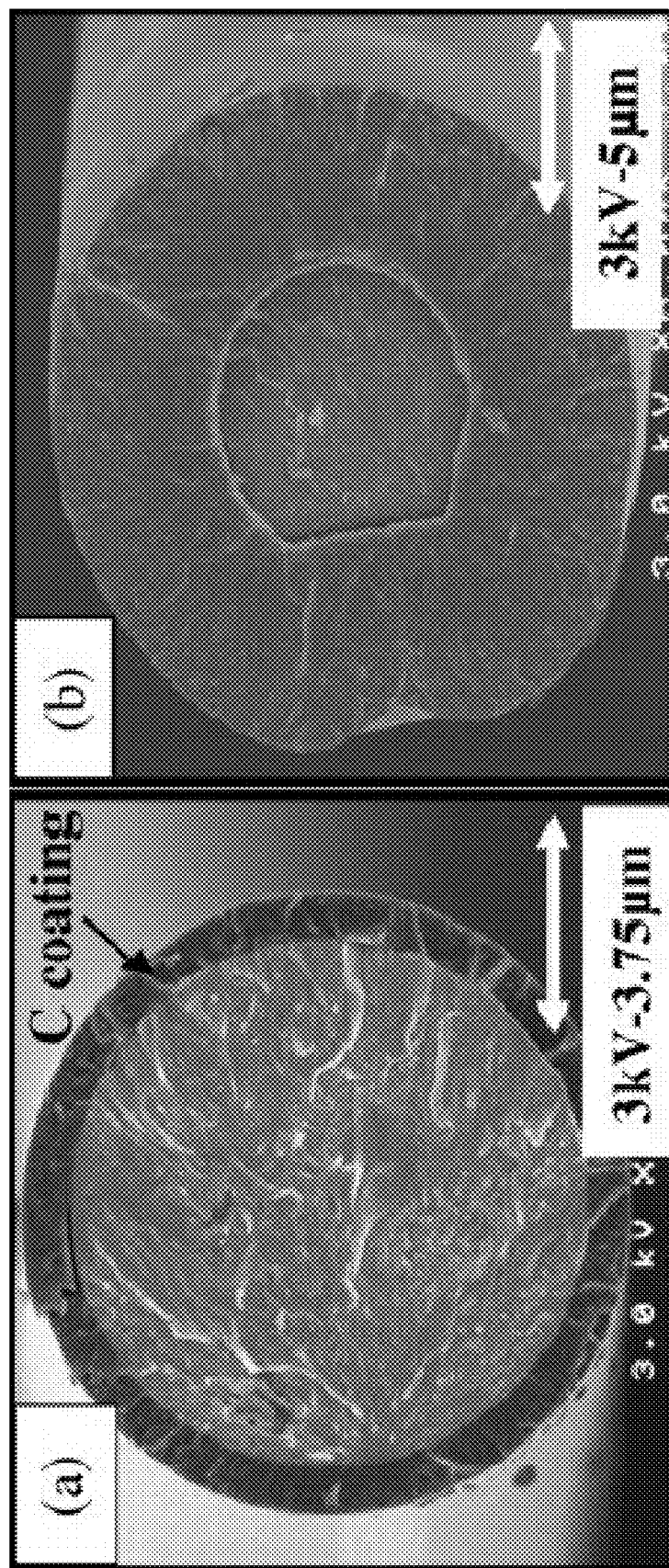
FIG. 17 depicts sample SiC fibers after chlorine etching.

One approach to in-situ coating was recently proposed by Delcamp et al. [b2]. It consists of creating a coating out of the fibers' material by selectively etching the Silicon out of the SiCf surface, thus creating a layer of carbon insulating a (now smaller diameter) core SiCf. This was accomplished by exposing Tyranno ZMI (UBE Industries) or Nicalon NLM-202 (Nippon Carbon Corp.) SiCf preforms (cloth, braid) to Chlorine gas at a temperature of 550-675° C. Sample coatings obtained by this method are shown in FIG. 17, sample SiC fibers after chlorine-etching at 600° C. for 3 hours. Left: Tyranno ZMI, Right: Nicalon NLM-202. Source: [b2]

The resulting carbon coating appears fairly uniform. However, closer examination showed them to be nanoporous (pore size <2 nm). Subsequent thermogravimetric analysis showed that this porosity causes the carbon to oxidize at much lower temperatures than fully crystallized carbon: 225° C. vs. 400° C. for graphite.

Figure 18:
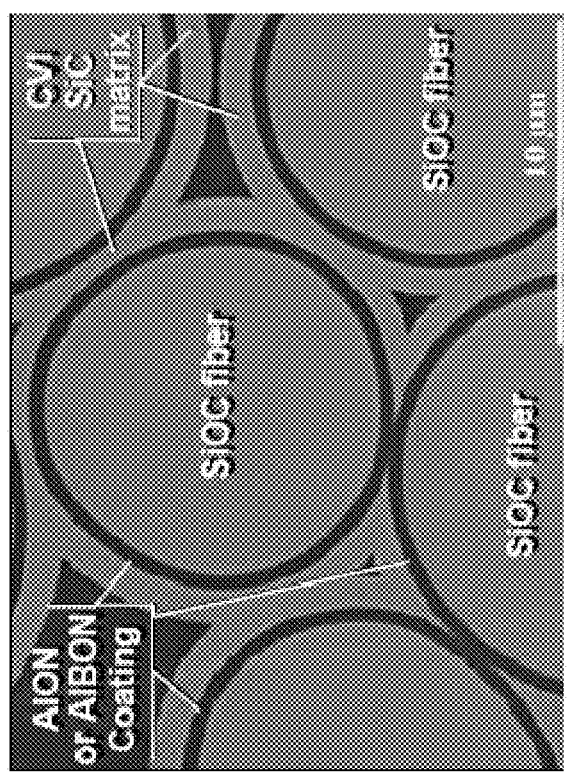

This remark essentially disqualifies the carbon remnant created by etching out the Silicon from being used as a CMC interphase materials. It also justifies follow up works by the same team [b2] to substitute the nanoporous carbon layer on a SiOC fiber (Tyranno ZMI) with either Aluminum Oxi-Nitride (Al—O—N) or Aluminum Boro Oxinitride (Al—B—O—N) [b3]. This was accomplished by impregnating the preform with Aluminum Trichloride ($AlCl_3$)—or respectively Boric Acid ($B(OH)_3$) and $AlCl_3$ in succession—and reacting it at 950-1000° C. in under an ammonia atmosphere. Although the mechanisms of carbon consumption are not altogether clear, the group suggests that carbon is evacuated in gas form as Hydrogen Cyanide gas (HCN). Under SEM examination, shown in FIG. 18 a high resolution SEM of a polished cross-section showing the remaining layer of nanoporous carbon with an overlay of Al—ON. Source: [b3], the resulting CMC structure appears to be very close to the fictitious SEM of the desired coating in FIG. 16.

Figure 19:
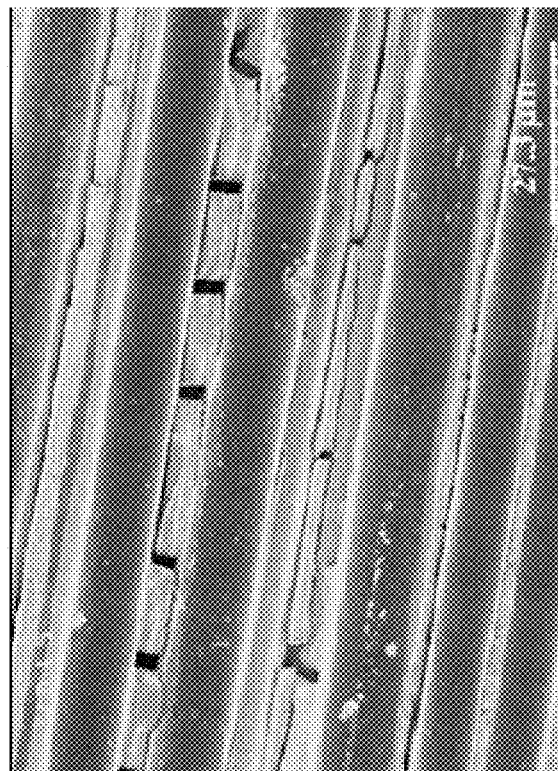
FIG. 19 is a view of the same CMC microstructure along a fracture surface parallel to the fibers showing incomplete coverage of the coating.

However, close examination of fracture surfaces along the fibers' axis reveals an incomplete coverage that the authors attribute to incomplete impregnation by the $AlCl_3$ solution—FIG. 19 is a view of the same CMC microstructure along a fracture surface parallel to the fibers showing incomplete coverage of the coating. Source: [b3]

It should be noted however that the pattern of evenly spaced fracture observed in FIG. 19 is also consistent with mismatched thermal expansions between interphase, fiber, and matrix.

The approach proposed by Delcamp et al. in [b2] and [b3] may be promising for in-situ coatings. In fact, the carbon substitution step is very similar to earlier works by Shen et al. [b4]—discussed further below—who used it to coat BN on SiCf, except that Shen et al.'s approach was not developed for in-situ processes and did not create a layer of nanoporous carbon. It should be noted however that Shen et al. [b4] pointed out the extensive level of process-induced damage to the fiber. The same conclusion may apply to the approach proposed by Delcamp et al. in [b3], although no mechanical tests were reported on the resulting CMC.

Limitations on Spool-to-Spool Coating of SiC Fiber Tows:

We refer here to a stand-alone process that applies a uniform coating to filaments and tows as they continuously transit through a coating apparatus. This type of unit process is inherently appealing as it would coat the fibers prior to their utilization in composite manufacturing. Many users, including NASA, have expressed the desire to see pre-coated SiC fiber tows be commercially available. This demand is not unusual. Pre-coated fibers are commonly used in the textile industry, and even in the processing of specialty fibers such as Kevlar™ (Poly-paraphenylene terephthalamide), glass, and carbon fibers. In order to produce a uniform, adhesive coat, fibers are typically spread out and de-sized (not necessarily in this order) before being coated. After coating, the spread filaments are regrouped into a tow and re-sized (also not necessarily in that order). This of course assumes that the sizing agent can be dissolved, put back, and that fiber tows can undergo spreading and remain undamaged.

Prior art involving tow spreading and de-sizing of SiCf:

The steps needed to replicate prior continuous tow coating of other specialty fibers are:

Remove any twist previously imposed on the tow
Burn up or evaporate sizing.
Spread the tow prior to coating to prevent fiber agglomeration during coating and promote even distribution of coat.
Coat tow.
Focus tow back, apply sizing agent, and twist if needed prior to spooling.

Attempts at applying this procedure to commercial SiCf tows appear to have so far failed [b5]. The reasons for this failure are many and conspire to make coating by this method "one of the most difficult problems there is" according to certain experts [b5]. Removing the sizing results in a dramatic reduction in fiber strength that cause them to "explode" even under minimal loading prior to even reaching the coating stage. Wesson [b5] reports that sizing, which acts as a lubricant among filaments, also evens out filament loading distribution. As sizing is removed, abrasion amongst filaments in the fiber tow causes necking damages that lower the overall strength. Moreover, differential loading increases between filaments as sizing disappears. This exacerbates the already damaged filaments causing a catastrophic failure of the tow while still in the sizing removal furnace. The overall conclusion of the experiments reported by Wesson [b5] is that either sizing is removed and the fiber fails catastrophically before reaching the spreading stage, or sizing is only partially removed, causing filaments to clump together and fail under the air knife during spreading. Either way, it appears that sizing removal is a processing stage that causes far more damage than the benefits it brings. Alternatively, steps 1 and 2 could respectively be skipped if tows could be procured without twist, and if they could be procured without sizing.

Obtaining un-twisted and un-sized SiCf tows has also been investigated. Both Wesson [b5] and Curtis and Spilker [b6] report that such SiCf tows do not handle well. Assuming un-twisted, un-sized tows were able to reach the end use process, it would be nearly impossible to weave or make preforms with them, due to self-inflicted damage among filaments. More importantly, un-sized or un-twisted fiber tows are extremely difficult to un-spool. Filaments from the section of tow still on the spool catch on the section being unwound, making a spider web like structure that grows worse with un-spooling. Wesson [b5] independently concurs based on experience with trying to spool un-sized carbon fiber tows. A fraction of un-sized filaments tend to break during spooling, back-winding and catching incoming tow, eventually forming a solid block of tangled filaments that Wesson characterizes as a "brick." One conclusion is that if a coating step is to be effected by a diffusion driven process such as CVD on a fiber tow, it must happen before filaments are focused into a tow, sized, and spooled. De-sizing, or spreading a SiCf tow appear to cause so much process induced damages that they are impractical. The original analysis of the tribological behavior of SiCf presented next is supportive of the experimental findings reported by Wesson [b5].

Figure 20:
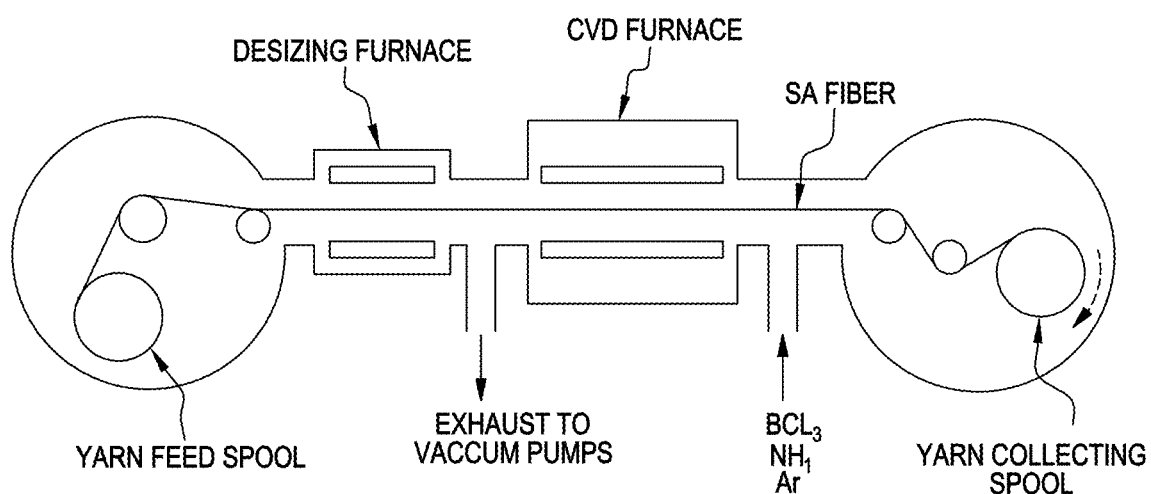
FIG. 20 is a schematic diagram of an exemplary continuous yarn coating reactor.

Prior Art Without Tow Spreading:

Published attempts at continuous CVD coating of SiCf tows are fairly recent (2000 and 2003) and originate from Germany [b7] and Japan [b8] respectively. Both involve de-sizing, but none use tow spreading. The Japanese article in particular is very revealing of tribological constraints on the fiber coating process. Suzuki et al. [b8] indeed report attempts at spool-to-spool batch coating of SiC yarns without spreading and de-sizing. Experiments aimed at depositing BN onto SiCf by CVD from a mix containing $BCl_3$, $NH_3$ and Ar onto Tyranno SA fibers at 1580° C. and 1.3 kPa without de-sizing them first resulted in BN films that did not adhere to the fiber and flaked off. The deposition system was therefore modified to include a de-sizing furnace as depicted in FIG. 20, a schematic diagram of the continuous yarn coating reactor used by Suzuki et al. [b8] (Yarn speed 4.5 mm/s).

By de-sizing at 800° C. first, the coating became adhesive to the fiber. Interestingly, the authors acknowledge having to drastically reduce the yarn tension after adding the de-sizing step. The yarn tension reported was a minute 100 mN for a 1600 filament tow, with each filament 7.5 microns in diameter. This certainly corroborates the tribological argument made by Wesson [b5] and the original analysis presented elsewhere herein. The effect of low yarn tension, according to the authors, resulted in a loosening of the filament bundle thereby improving intra-yarn diffusion and yielding a more uniform coating thickness, in the 200-500 nm range. Yet, the authors also acknowledge a bundling of the innermost fibers in the yarn resulting in uneven coating. Filaments were tested in tension and appear to retain 90% of their pre-coating tensile strength. The results of Suzuki et al. [b8] appear to come close to the stated objective of a stand-alone spool-to-spool tow coating process.

Hopfe et al. [b9] promotes the use of LCVD to coat fibers. Hopfe et al. assume however that the tow is spread into a plane ribbon prior to entering the CVD reactor. Nothing is mentioned however as to how the tow would be placed in such a configuration.

In 2008, General Electric (GE-Aviation) was awarded an Air Force Materiel Command contract for "In-Line Tow Coating for Silicon Carbide (SiC) Fibers" [b11]. The specifics of this work may be confidential.

Other Approaches:

Two additional published articles that sidestep the issue of tow de-sizing and spreading by starting from a fiber that is other than SiC, but comes out of the reactor as SiC. The first by Lackey et al. [b12] proposes and tests the use of an electrostatic tow spreader on un-sized Carbon fibers (Amoco T-300, 3000 filaments/tow) that are exposed to a mix of Methyl-Trichloro-Silane (MTS) and hydrogen to deposit a layer of Silicon. The Silicon is reacted with the Carbon in the fiber at a temperature between 1050-1400° C. in the same environment to produce Silicon Carbide filaments. Although the fiber morphology changes drastically with process parameters, the authors claim a tensile strength of 4 GPa, which is at the high end of the SiCf spectrum. The authors claim, but have not shown, that a coating could be added prior to focusing and sizing the fibers.

An article by Newell and Puzianowsky [b13] that came out four years after Lackey et al.'s [b12] makes similar claims but starting with a prior conversion of Kevlar fibers to Carbon. The tow is claimed to be spread using a Venturi spreader but no experimental data is shown.

Summary:

The shortcomings of the prior art are addressed, and additional advantages are provided by the present invention which in one aspect is an interphase production method that prevents SiC fibers from cross-linking, hence promotes toughness and oxidation resistance of the ceramic matrix composite.

To prevent the brittle failure of fiber reinforced ceramic matrix composite materials in fiber and matrix which are made of the same or similar materials, such as Silicon Carbide fiber reinforced Silicon Carbide matrix composites, it is necessary that a coating—called an "interphase"—be interposed between fiber and matrix. Current interphase coating methods for Silicon Carbide fibers are applied only after the fibers have been processed into their final position by either weaving, braiding, or other method of fiber placement. This is called "in-situ" coating.

In-situ coating is usually the last process step applied to fibers, just prior to matrix infiltration. This order is rendered necessary by the extreme tribological properties of SiC fibers and may result in fibers being in direct contact with each other prior to interphase coating. The result is that fibers may fuse or bond together at such contact points during coating, matrix infiltration, or during use, forming "bridges" that become weak points of the resulting ceramic matrix composite material.

The present invention modifies the in-situ coating process by adding a selective removal (e.g., etch) of Silicon from SiC on the surface of the fiber, and then replacing the remaining nanoporous carbon layer with an interphase layer (e.g., Boron Nitride), that coats and separates the fibers, thus preventing bridging.

More particularly, the present invention in one aspect is a method of forming an interphase in a ceramic matrix composite material having a plurality of SiC fibers, which maximizes toughness by minimizing fiber to fiber contact, including arranging a plurality of SiC fibers into a preform;

selectively removing (e.g., etching) silicon out of the surface of the fibers resulting in a porous carbon layer on the fibers; and replacing the porous carbon layer with an interphase layer (e.g., Boron Nitride), which coats the fibers to thereby minimize fiber to fiber contact in the preform.

The interphase layer may comprise Boron Nitride, in which case the method may include infiltrating the preform with Boric Acid; and reacting the Boric Acid with the carbon and an N-yielding compound to form the Boron Nitride layer. The method further includes infiltrating the preform with matrix material, resulting in a ceramic matrix composite material.

Additional features and advantages are realized through the techniques of the present invention. Other embodiments and aspects of the invention are described in detail herein and are considered a part of the claimed invention.

Detailed Description:

First Principles Analysis Using SiCf Tribology:

Attempts at replicating with SiCf the type of continuous spool-to-spool tow coating applied to other specialty fibers have so far failed. The cause of this failure appears to be the peculiar tribological behavior of SiCf preventing the concomitance of tow spreading and de-sizing. Indeed the fiber's constitutive material is very stiff (Young's Modulus 300-400 GPa), very hard (30-40 GPa), and has a high coefficient of friction with itself (0.5-0.7). To better understand the limiting physics at play during SiCf tow processing, consider an original illustrative example of the tribological behavior of two SiC filaments.

Figure 21:
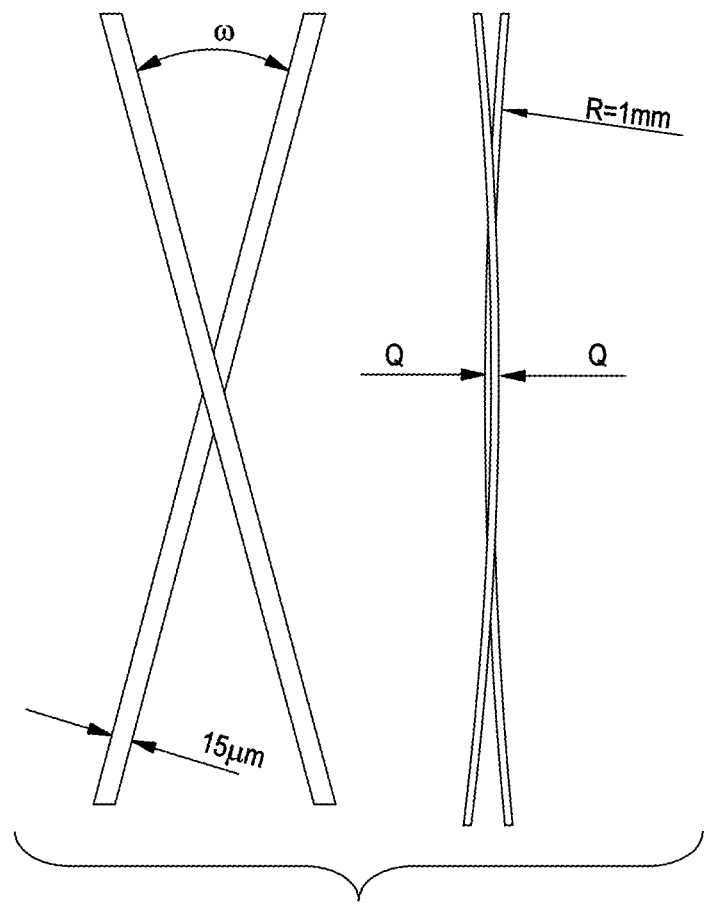
FIG. 21 is an example of two SiC filaments crossing over at an angle ω and subject to a contact load Q.

Consider a pair of 15 μm SiC filaments crossing over at an angle ω under a contact load Q as shown in FIG. 21, an example of two SiC filaments crossing over at an angle ω and subject to a contact load Q. Left: Top view magnified; Right: Side view.

Figure 22:
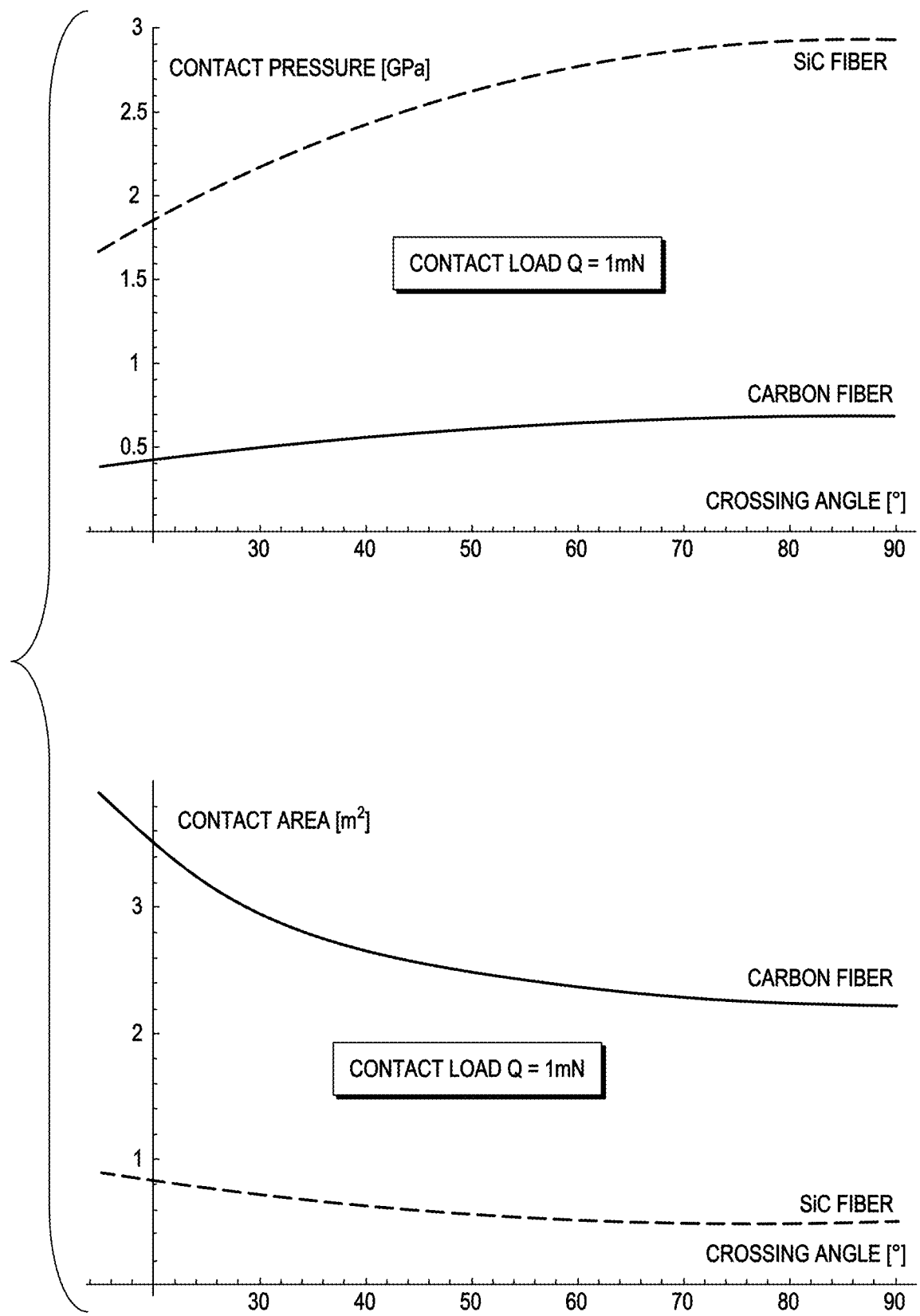
FIG. 22 are graphs of maximum contact pressure (GPa) and contact area ($\mu m^2$) as a function of the μm crossing angle for pairs of 15 SiC and C filaments under a load of 1 mN.

On the basis of first principles, the Hertzian ellipsoid contact theory [b14] allows an estimate of the maximum contact pressure where the fibers are in contact. For example, under a load as minute as 1 mN and for a crossing angle of 30°, the maximum contact pressure is already 2.2 GPa with a contact area less than a square micron. FIG. 22 shows maximum contact pressure (GPa) and contact area (μm$^2$) as a function of the μm crossing angle for pairs of 15 SiC and C filaments under a load of 1 mN. FIG. 22 expands this example and plots the maximum contact pressure and contact area for crossing angles ranging from 10° to 90°. If it is further assumed that the fiber contact is sliding at the modest speed of 1 cm/s, then the maximum areal power dissipated at the fiber contact is 13 MW/m$^2$.

It should be noted that the values used in this example are well below those that would likely occur in actual tow processing, such as tow spreading, de-sizing or coating. For example, 1 mN is the load that would be exerted on 15 μm SiC monofilaments in a 2×2 mm square weave pattern.

To put these numbers in perspective, FIG. 22 also offers an objective comparison to carbon on carbon. The same derivations for identical load and filament geometry show that for Carbon, the contact pressure is one order of magnitude smaller and the contact area is three times larger compared to SiC fibers under the same conditions. Similarly, the areal power dissipated under identical sliding conditions drops to 200 kW/m$^2$—a reduction by five orders of magnitude. Such a huge difference between the two materials is rather startling, especially considering that the Carbon fibers' Young's modulus is of the same order as that of current SiC fibers (~300 GPa). This difference can however be explained by the extraordinary forgiving nature of crystallized graphite and its extremely low coefficient of friction.

While it is true that along its axis—direction of its basal planes—a graphitic carbon fiber is extremely stiff (>300 GPa), it is comparatively soft in the radial direction—perpendicular to the basal planes—with a Young's modulus of 36 GPa [b15]. When we further take into account that the coefficient of friction of graphitic carbon on itself is 60 times smaller than that of SiC on itself, the extreme difference in areal power dissipation is not surprising.

The above example can explain the difficulty of replicating with bare SiCf tows what is commonplace processing for graphitic carbon fibers. The slightest load among filaments is likely to cause extensive wear damage as was earlier asserted by Wesson [b5].

That is why SiCf are "sized"—usually with Poly Vinyl Alcohol (PVA)—right after the spinning process. The sizing agent envelops fibers with a protective soft material sheath that prevents direct fiber-to-fiber contact and promotes fiber sliding. Without it, SiCf tows could not be processed using textile equipment, could not be woven, or pre-formed.

SiC Fiber Etching:

As discussed earlier, the selective etching of Silicon out of SiCf leaves a layer of nanoporous carbon. The subject is worth re-visiting for its value to the present invention, and to expose the risks of process-induced damage to the fiber that one would have to mitigate in the process of substitution coating. Independent research papers conclude that selective removal of Silicon or Carbon out of SiCf results in a significant degradation of the fibers' mechanical properties.

Shen et al. [b4] achieved a removal of carbon from carbon-rich SiC filament strands (Nicalon and C-Nicalon) by dip-coating in Boric Acid (B(OH)$_3$) and subsequently heating them to 1000° in an Ammonia (NH$_3$) atmosphere. The main reaction was a carbothermal reduction of the Boric Acid, which removed Carbon as CO and CO$_2$, substituting it with Boron, which reacted with Ammonia to form Boron Nitride. Additional chemical pathways led to the formation of Boron Oxide (B$_2$O$_3$), which Shen et al. claim to be further reduced by Ammonia along the following pathways:

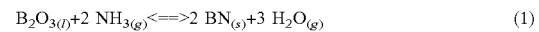

$$B_2O_{3(l)} + 2\ NH_{3(g)} \mathrel{<==>} 2\ BN_{(s)} + 3\ H_2O_{(g)} \tag{1}$$

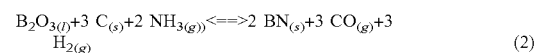

$$B_2O_{3(l)} + 3\ C_{(s)} + 2\ NH_{3(g)} \mathrel{<==>} 2\ BN_{(s)} + 3\ CO_{(g)} + 3\ H_{2(g)} \tag{2}$$

The coating was found to be mostly amorphous Boron Nitride, about 200 nm thick, with remaining Boron Oxide, which the authors attribute to (EQ.1) being the rate limiting step. Shen et al. [b4] report relative losses of tensile strengths of 15-85% for Nicalon and C-Nicalon SiCf respectively.

Delcamp et al. [b2], who only applied chlorine etching to selectively remove Silicon and generate a PyC coating on Tyranno ZMI and Nicalon NLM-202 fibers, did not report any tensile strength data. It is likely however that such measurement would offer a conclusion similar to that of Shen et al. [b4]. Chlorine etching of Silicon Carbide, like oxidation, is not isotropic [b16]. It is therefore likely that etching would be uneven, leading to structural flaws in the fibers. This assertion is supported by the findings of Rebillat et al. [b17], who investigated the effect of CVD/CVI coating of BN on SiCf, a research that is particularly relevant to coating of SiCf using Boron Halide precursors. The authors observed that the chemical reaction leading to the deposition of BN can proceed both ways, which means that deposited BN is simultaneously etched away with the coating representing the rate balance of the reaction according to the following reaction:

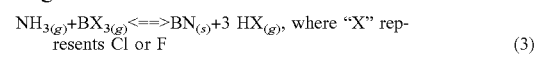

$$NH_{3(g)} + BX_{3(g)} \mathrel{<==>} BN_{(s)} + 3\ HX_{(g)}, \text{ where "X" represents Cl or F} \tag{3}$$

Figure 23:
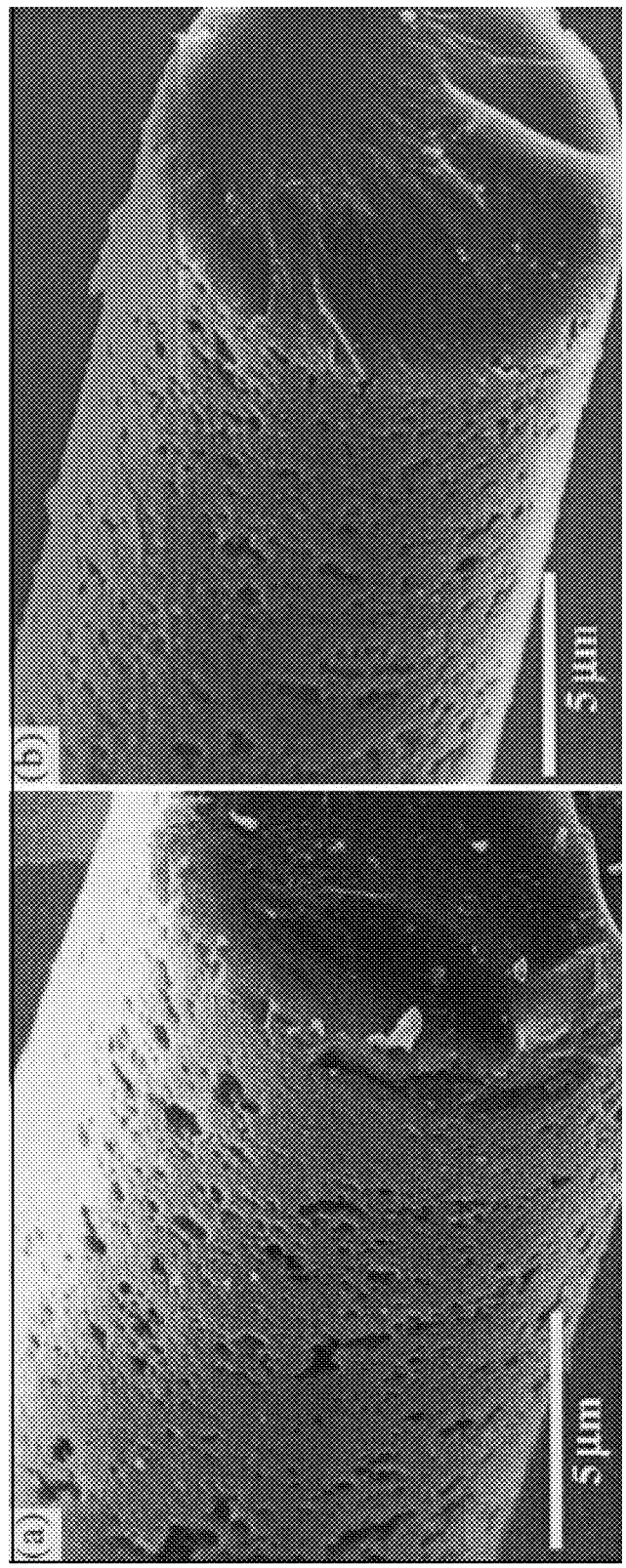
FIG. 23 is shows the effect of SiCf exposure to BF3 (left) and HF diluted in Ar (right)

It is also noted that the halogen acid formed in the CVD reaction (HF, and to a lesser extent HCl) are extremely efficient at etching Silicon, which is then evacuated in gaseous halide form. Therefore, there is a legitimate concern that fibers may experience damage during deposition and Rebillat et al. [b17] validate that concern, both by direct inspection of the fiber (FIG. 23), and by measuring a drop of nearly 50% in tensile strength (~1 GPa). FIG. 23 shows the effect of SiCf exposure to BF3 (left) and HF diluted in Ar (right) [b17].

The main conclusion of this section is that any attempt at selective etching of Silicon or Carbon will be associated with a level of process-induced damage that will manifest itself in a loss of tensile strength. Should this approach be used in generating in-situ coating, one must take care to minimize its impact.

Carbon Substitution Coating:

The main advantage of carbon substitution for in-situ coating is to prevent fiber bridging. Wherever SiCf are in contact in a preform, selective etching of Silicon will result in a carbon layer separating the non-etched SiC core of the fiber.

Discussed above was one method of carbon substitution developed by Delcamp et al. [b2] to create an AlON or AlBON interphase layer. An earlier approach, demonstrated on isolated fiber strands of Carbon-rich Silicon Carbide fibers by Shen et al. [b4], consists of simultaneously substituting Carbon with Boron, and proceed with a nitridation of the coating with Ammonia. It is certainly more relevant to the context of BN coating as discussed above but required fibers that were either pre-coated with carbon, or had excess carbon.

It should be noted that the carbon substitution method introduced by Shen et al. [b4] to produce BN coating has not been demonstrated or claimed for in-situ coating. Only the selective etching of Silicon was demonstrated in-situ and published by Delcamp et al. [b2], who then went on to substitute the remaining carbon with AlON or AlBON.

Finally, Kusunose et al. [b18] produced tBN-coated SiC nanoparticles in a manner reminiscent of Shen et al.'s approach [b4]. A mix Silica ($SiO_2$), Boric Acid, and Carbon was ball milled to produce a fine dispersion of nanoparticles. Heating to 800° C. first transformed Boric Acid into Boron oxide, which then reacted with silica to produce borosilicate glass nanoparticles. Subsequent heating to 1550° C. under a nitrogen atmosphere caused the carbothermal reduction of $SiO_2$ and $B_2O_3$, and the nitridation of Boron to form BN coated SiC nanoparticles. The BN was characterized as turbostratic.

The present invention improves in-situ coating of Silicon Carbide fibers with Boron Nitride in Ceramic Matrix Composite applications. Current in-situ coating technology is constrained by the lack of availability of pre-coated fibers. Therefore coating is applied to the fibers after they have been woven, braided, or otherwise preformed. After desizing, areas of the fibers that are in close contact may fuse with high-temperature processing or use. This causes what is known as "bridging" and results in lower toughness properties for the composite.

The present invention prevents bridging by creating a separation between fibers that is then filled with a suitable interphase material, in one exemplary case, Boron Nitride. The process steps required to attain this object consist of first creating a thin layer of nanoporous carbon out of the fiber's very own material, and then substituting or replacing the carbon by an appropriate method. This process may be implemented as follows:

1. Selectively remove (e.g., etch) Silicon out of the surface of SiC fibers in a preform with, e.g., Chlorine or Fluorine. To limit etching-induced damages, etching should be controlled to a depth of no more than 100 nm.
2. Infiltrate the preform with, e.g., Boric Acid. This can be accomplished by introducing Boric Acid in solution (water, alcohol, or acetone) with subsequent evaporation of the solvent. Alternatively, Boric Acid can be introduced in liquid form at a temperature above 170° C. (melting point of Boric Acid), or preferably in gas form at a temperature between 300 and 575° C. (respectively boiling point and thermal dissociation of Boric Acid). Care should be taken that Boric Acid be allowed to infiltrate the carbon layer nanopores, for example by drawing a vacuum prior to infiltration of the Boric Acid.
3. The next process step can be operated either in sequences or in a single step in a manner analogous to Shen et al. [b4] or Kusunose et al. [b18].
   a. A sequential approach first converts the deposited Boric Acid to liquid Boron Oxide by thermal dissociation at 575° C., as per (Eq. 4) Boron oxide is then turned to Boron by carbothermal reduction below 1400° C. (Eq. 5) to avoid the formation of Boron Carbide (Eq. 6). A nitridation of the Boron coating completes the transformation to Boron Nitride (Eq. 6):

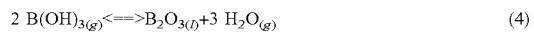

$$2\ B(OH)_{3(g)} \Longleftrightarrow B_2O_{3(l)} + 3\ H_2O_{(g)} \quad (4)$$

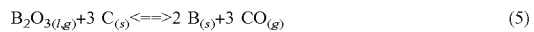

$$B_2O_{3(l,g)} + 3\ C_{(s)} \Longleftrightarrow 2\ B_{(s)} + 3\ CO_{(g)} \quad (5)$$

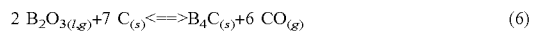

$$2\ B_2O_{3(l,g)} + 7\ C_{(s)} \Longleftrightarrow B_4C_{(s)} + 6\ CO_{(g)} \quad (6)$$

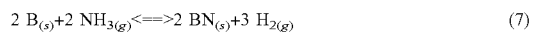

$$2\ B_{(s)} + 2\ NH_{3(g)} \Longleftrightarrow 2\ BN_{(s)} + 3\ H_{2(g)} \quad (7)$$

b. an alternative is to operate a single step carbothermal reduction at 1000° C. under ammonia atmosphere, or at 1550° C. under Nitrogen. The process is then driven by (Eq. 1) and (Eq. 2) discussed above. A single step exposure proceeding from nanoporous carbon is also preferable since if will yield turbostratic BN, while a multistep exposure was shown to yield amorphous BN, which is less desirable as an interphase material.

It should be noted that compared to prior works, the layer of Boron Nitride does not need to be thick. In fact, a layer of 25 nm should be sufficient if the deposited BN is turbostratic, twice that if BN is fully crystallized hexagonal BN. The thin layer objective is aided by the fact that the starting carbon layer is nanoporous. The carbothermal reduction results in a reduction of the molar volume to 70% of its original size. The nitridation step causes an increase in molar volume to 166% the original size, which densifies the coating layer.

Nanoporosity of the starting carbon coating will also favor the growth of turbostratic BN at temperatures below 2000° C. Above this temperature, turbostratic fully crystallizes to hexagonal BN.

Addition of the matrix material is then performed, resulting in a tough, ceramic matrix composite material.

In that regard, the present invention is in one aspect a method of forming an interphase in a ceramic matrix composite material having a plurality of SiC fibers, which maximizes toughness by minimizing fiber to fiber bridging, including arranging a plurality of SiC fibers into a preform; selectively removing (e.g., etching) silicon out of the surface of the fibers resulting in a porous carbon layer on the fibers; and replacing the porous carbon layer with an interphase layer (e.g., Boron Nitride), which coats the fibers to thereby minimize fiber to fiber bridging in the preform.

The interphase layer may comprise Boron Nitride, in which case the method may include infiltrating the preform with boric acid; and reacting the Boric Acid with the carbon and an N-yielding compound to form the Boron Nitride layer. The method further includes infiltrating the preform with matrix material, resulting in a ceramic matrix composite material.

Summarizing, a ceramic matrix composite material is formed having a plurality of SiC fibers, by performing a selective removal of Silicon from SiC on the surface of the fibers resulting in a porous carbon layer, and replacing the remaining porous carbon layer with an interphase layer, which coats the fibers, thus preventing fiber bridging prior to infiltration of a matrix material.

Any of the above methods, products, or products resulting from said methods, fall within the scope of the present invention.

The present invention will be of interest to all parties with an interest in high-temperature structural components, with the exception of nuclear applications for which the use of Boron is counter-indicated. For components expected to be oxidation prone, this includes all internal combustion engines, with a specific near term and pressing interest in jet engines and turbine power generation.

This invention is expected to find an important place in all high and ultra-temperature applications such as rocket nozzles, hypersonic domes, jet engines, power generation, high-efficiency internal combustion engines, and armor applications. Anticipated impact is economic: Improved performance, more affordable SiC-SiC composite materials.

Each of the following documents is hereby incorporated herein by reference in its entirety:

[b1] A. Delcamp, L. Maine, B. Rufino, S. Mazerat, R. Pailler, A. Guette, P. Weisbecker, H. Plaisantin, E. Philippe, S. Loison; Surface & Coatings Technology 205 (2010) 703-709

[b2] A. Decamp, L. Maille, S. Saint Martin, R. Pailler, and A. Guette; Composites Science and Technology 70 622-626 (2010)

[b3] L. Shen, B. J. Tan, W. S. Willis, F. S. Galasso, and S. L. Stuib, J. Am. Ceram. Soc. 77 [4] 1011-1016 (1994)

[b4] S. Wesson, Adherent Technologies, Private Communications (Aug. 19, 2010)

[b5] J. Curtis and H. Spilker, ATK-COI Ceramics, Private Communications, Aug. 23, 2010

[b6] E. Pippel, J. Wolterdorg, D. Dietrich, S. Stokel, K. Weise, G. M. Marx, J. Eur. Ceram. Soc. 20 1837-1844 (2000)

[b7] M. Suzuki, Y. Tanaka, Y. Inoue, N. Miyamoto, M. Sato, K. Goda, J. Ceram. Soc. Jap. 111 [12] 865-871 (2003)

[b8] V. Hopfe, A. Tehel, G. Leonhardt, German Patent DE 40 18 940.6-45 (1991)

[b9] Pegna, J., NASA SBIR Phase I final report, Contract No. NNX11CD80P (2011)

[b10] W. J. Lackey, J. A. Hanigofsky, G. B. Freeman, R. D. Hardin, and A. Prasad, J, Am. Ceram. Soc., 78 161 1564-70 (1995)

[b11] J. A. Newell and A. A. Puzianowski, High Perf. Polym. 11, 197-203 (1999)

[b12] J. F. Antoine, C. Visa, C. Sauvey, G. Abba, Trans. ASME, J. Tribology [128]660-664 (2006)

[b13] S. M. Lee, Handbook of Composite Reinforcements, Wiley-VCH, Palo Alto, Cap. 97 (1993)

[b14] N. S. Jacobson and D. L. Myers, Oxid Met 75, 1-25 (2011)

[b15] F. Rebillat, A. Guette and C. R. Brosse, Acta mater. Vol. 47, No. 5, 1685-1696 (1999)

[b16] T. Kusunose, T. Sekino and Y. Ando, Nanotechnology 19 1-9 (2008)

[b17] A K Khanra, Bull. Mater. Sci., 30 [2], pp. 93-96. (2007)

In summary, the following inventions are disclosed herein, usable independently or together, in accordance with the present invention.

I. Method And Apparatus For Large Scale Manufacturing Of High Strength Ceramic Fibers Using A Plurality Of Controllable Lasers—A method and apparatus for forming a plurality of fibers from (e.g., CVD) precursors, including a reactor adapted to grow a plurality of individual fibers; and a plurality of independently controllable lasers, each laser of the plurality of lasers growing a respective fiber of the plurality of fibers. The reactor and lasers may grow the fibers according to Laser Induced Chemical Vapor Deposition. The plurality of lasers in one embodiment comprises Quantum Well Intermixing (QWI) lasers.

II. Nanocoating Systems For High Performance Fibers For Directing Micro-Cracks And Endowing Matrix Composites With An Immune Response To Micro-Cracking And Oxidation—A high performance fiber (HPF) structure, including a plurality of fibers arranged in the structure; a matrix disposed between the fibers; wherein a multilayer coating is provided along the surfaces of at least some of the fibers. The multilayer coating includes: an inner layer region having a sheet-like strength; and an outer layer region, having a particle-like strength, such that any cracks propagating toward the outer layer from the matrix propagate along the outer layer and back into the matrix, thereby preventing the cracks from approaching the fibers. In one embodiment, the inner layer region acts as an oxygen barrier for the fiber, and wherein, upon exposure to oxygen, at least a portion of the outer layer region converts into an oxygen barrier similar to the inner layer region, thereby providing greater protection to the fiber.

III. Non-Bridging In-Situ Boron Nitride Coating Of Silicon Carbide Fibers In Ceramic Matrix Composite Materials—A method of forming an interphase in a ceramic matrix composite material having a plurality of SiC fibers, which maximizes toughness by minimizing fiber to fiber bridging, including arranging a plurality of SiC fibers into a preform; selectively removing (e.g., etching) silicon out of the surface of the fibers resulting in a porous carbon layer on the fibers; and replacing the porous carbon layer with an interphase layer (e.g., Boron Nitride), which coats the fibers to thereby minimize fiber to fiber bridging in the preform.

What is claimed is:

1. A high performance fiber (HPF) structure, comprising:
a plurality of fibers arranged in the structure;
a matrix disposed between the fibers;
wherein a multilayer coating is provided along the surfaces of at least some of the fibers, the multilayer coating including at least two layer regions:
an inner layer region;
an outer layer region, wherein the multilayer coating has a crystallization gradient from crystallized to turbostratic as the radius increases from the inner layer region to the outer layer region,
thereby creating a shear strength gradient such that a crack propagating into the at least two layer regions is directed back toward the matrix, thereby protecting the fibers while dissipating crack energy.

2. The structure of claim 1, wherein the inner layer region comprises graphitic carbon and the outer layer region comprises pyrolytic carbon.

3. The structure of claim 1, wherein the inner layer region comprises hexagonal Boron-nitride, and the outer layer region comprises turbostratic Boron-nitride.

4. The structure of claim 1, wherein the structure induces a high-density microcracking effect within the matrix, substantially increasing the strength of the HPF.

5. The structure of claim 1, wherein the inner layer region acts as an oxygen barrier for the fiber.

6. The structure of claim 5, wherein, upon exposure to oxygen, at least a portion of the outer layer region converts into an oxygen barrier similar to the inner layer region, thereby providing greater protection to the fiber.

7. A method of forming a high performance fiber (HPF) structure, comprising:
providing a plurality of fibers arranged in the structure;
providing a matrix disposed between the fibers;
providing a multilayer coating along the surfaces of at least some of the fibers, the multilayer coating including at least two layer regions:
an inner layer region;
an outer layer region, wherein the multilayer coating has a crystallization gradient from crystallized to turbostratic as the radius increases from the inner layer region to the outer layer region,
thereby creating a shear strength gradient such that a crack propagating into the at least two layer regions is directed back toward the matrix, thereby protecting the fibers while dissipating crack energy.

8. The method of claim 7, wherein the inner layer region comprises graphitic carbon and the outer layer region comprises pyrolytic carbon.

9. The method of claim 7, wherein the inner layer region comprises hexagonal B-nitride, and the outer layer region comprises turbostratic B-nitride.

10. The method of claim 7, wherein the structure induces a high-density microcracking effect within the matrix, substantially insulating the fiber from propagating cracks.

11. The method of claim 7, wherein the inner layer region is formed to act as an oxygen barrier for the fiber.

12. The method of claim 11, wherein, upon exposure to oxygen, at least a portion of the outer layer region converts into an oxygen barrier similar to the inner layer region, thereby providing greater protection to the fiber.

13. A method of forming an interphase in a ceramic matrix composite material having a plurality of SiC fibers, which maximizes toughness by minimizing fiber to fiber bridging, comprising:
arranging a plurality of SiC fibers into a preform;
selectively removing, by selective gaseous etching, silicon out of the surface of the fibers resulting in a remaining layer of nanoporous carbon out of the fibers' own material, on the fibers;
replacing the remaining layer of nanoporous carbon with an interphase layer, which coats the fibers to thereby minimize fiber to fiber bridging in the preform.

14. The method of claim 13, wherein the interphase layer comprises boron nitride.

15. A high performance fiber structure formed according to claim 14, wherein the boron nitride is a turbostratic boron nitride or a fully-crystalized hexagonal boron nitride.

16. The method of claim 14, further comprising:
infiltrating the preform with boric acid; and
reacting the boric acid with said carbon and an N-yielding compound to form said boron nitride layer.

17. The method of claim 13, further comprising infiltrating the preform with matrix material, resulting in a ceramic matrix composite material.

18. A ceramic matrix composite material formed according to claim 13.

19. A method of forming a ceramic matrix composite material having a plurality of SiC fibers, comprising performing a selective removal, by selective gaseous etching, of Silicon from SiC on the surface of the fibers resulting in a remaining layer of nanoporous carbon out of the fibers' own material, and replacing the remaining layer of nanoporous carbon with an interphase layer, which coats the fibers, thus preventing fiber bridging prior to infiltration of a matrix material.

20. A ceramic matrix composite material formed according to claim 19.

* * * * *